(12) United States Patent
Ding et al.

(10) Patent No.: US 11,983,751 B2
(45) Date of Patent: May 14, 2024

(54) SYSTEMS AND METHODS FOR DETECTING INBOUND AND OUTBOUND TRAFFIC AT A FACILITY

(71) Applicant: Walmart Apollo, LLC, Bentonville, AR (US)

(72) Inventors: Yi Ding, Lewisville, TX (US); Joseph Duffy, Plano, TX (US); Jiankun Liu, Dallas, TX (US); Tianyi Mao, Dallas, TX (US); Ryan B. Reagan, Fort Worth, TX (US); Zhichun Xiao, Plano, TX (US); Jinhan Zhang, Dallas, TX (US); Shouyi Zhang, Dallas, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 11 days.

(21) Appl. No.: 17/862,075

(22) Filed: Jul. 11, 2022

(65) Prior Publication Data

US 2022/0343668 A1 Oct. 27, 2022

Related U.S. Application Data

(63) Continuation of application No. 16/888,321, filed on May 29, 2020, now abandoned.

(51) Int. Cl.
*G06Q 30/0601* (2023.01)
*G06F 18/22* (2023.01)
(Continued)

(52) U.S. Cl.
CPC ......... *G06Q 30/0609* (2013.01); *G06F 18/22* (2023.01); *G06T 7/20* (2013.01);
(Continued)

(58) Field of Classification Search
CPC ....... G06Q 30/0609; G06F 18/22; G06T 7/20; G06T 2207/10016; G06T 2207/20081;
(Continued)

(56) References Cited

U.S. PATENT DOCUMENTS 5,465,115 A 11/1995 Conrad
6,696,945 B1 2/2004 Venetianer
(Continued)

OTHER PUBLICATIONS

Abbamonte, K.; "Loss Prevention: 4 Types of Retail Shrinkage and How to Prevent Them"; https://www.shopify.com/retail/loss-prevention-retail-shrinkage; Aug. 1, 2018; pp. 1-12.
(Continued)

*Primary Examiner* — Amara Abdi
(74) *Attorney, Agent, or Firm* — Foley IP Law, PLLC

(57) ABSTRACT

In some embodiments, apparatuses and methods are provided herein useful to detecting inbound and outbound traffic. In some embodiments, there is provided a system for detecting inbound and outbound traffic at a facility including a video camera and a control circuit configured to detect a human and estimate a location of the human; determine whether the detected human is inbound or outbound the facility based on a relative movement of the detected human within a first region, a second region, and a third region; and transmit data based on the determination.

16 Claims, 12 Drawing Sheets

Related U.S. Application Data

(60) Provisional application No. 62/854,251, filed on May 29, 2019, provisional application No. 62/854,227, filed on May 29, 2019, provisional application No. 62/854,242, filed on May 29, 2019.

(51) Int. Cl.
| | |
|---|---|
| *G06T 7/20* | (2017.01) |
| *G06V 10/74* | (2022.01) |
| *G06V 10/764* | (2022.01) |
| *G06V 10/82* | (2022.01) |
| *G06V 20/40* | (2022.01) |
| *G06V 20/52* | (2022.01) |
| *G06V 40/10* | (2022.01) |
| *G08B 5/22* | (2006.01) |
| *H04N 7/18* | (2006.01) |

(52) U.S. Cl.
CPC .......... *G06V 10/761* (2022.01); *G06V 10/764* (2022.01); *G06V 10/82* (2022.01); *G06V 20/40* (2022.01); *G06V 20/52* (2022.01); *G06V 20/53* (2022.01); *G06V 40/103* (2022.01); *G08B 5/22* (2013.01); *H04N 7/183* (2013.01); *G06T 2207/10016* (2013.01); *G06T 2207/20081* (2013.01); *G06T 2207/20084* (2013.01); *G06T 2207/30196* (2013.01); *G06T 2207/30232* (2013.01); *G06T 2207/30242* (2013.01)

(58) Field of Classification Search
CPC . G06T 2207/20084; G06T 2207/30196; G06T 2207/30232; G06T 2207/30242; G06T 2207/20076; G06T 2207/30241; G06T 7/292; G06V 10/761; G06V 10/764; G06V 10/82; G06V 20/40; G06V 20/52; G06V 20/53; G06V 40/103; G08B 5/22; G08B 13/19608; G08B 13/19645; G08B 29/186; H04N 7/183; H04N 7/181
See application file for complete search history.

(56) References Cited

U.S. PATENT DOCUMENTS

| | | | |
|---|---|---|---|
| 7,957,565 B1 | 6/2011 | Sharma | |
| 7,996,256 B1 | 8/2011 | Anand | |
| 8,325,036 B1 | 12/2012 | Fuhr | |
| 8,878,937 B2 | 11/2014 | Golan | |
| 9,158,975 B2 | 10/2015 | Lipton | |
| 9,165,190 B2 | 10/2015 | Zhang | |
| 9,311,645 B2 | 4/2016 | Edwards | |
| 9,378,632 B2 | 6/2016 | Venetianer | |
| 9,569,786 B2 | 2/2017 | Shaw | |
| 9,639,747 B2 | 5/2017 | Zhu | |
| 9,740,937 B2 | 8/2017 | Zhang | |
| 9,852,342 B2 | 12/2017 | Kanga | |
| 9,906,918 B2 | 2/2018 | Ozkan | |
| 9,928,708 B2 | 3/2018 | Lin | |
| 2003/0216969 A1* | 11/2003 | Bauer | G06K 17/00 705/22 |
| 2006/0239506 A1* | 10/2006 | Zhang | G06V 10/462 382/103 |
| 2008/0312871 A1 | 12/2008 | Salcedo | |
| 2009/0089107 A1 | 4/2009 | Angell | |
| 2013/0045751 A1 | 2/2013 | Chao | |
| 2013/0266196 A1 | 10/2013 | Kono | |
| 2014/0172476 A1 | 6/2014 | Goulart | |
| 2015/0094914 A1* | 4/2015 | Abreu | B60H 1/00742 701/1 |
| 2015/0194030 A1* | 7/2015 | Davidson | G08B 13/2468 340/572.7 |
| 2015/0294183 A1* | 10/2015 | Watanabe | G07C 9/00 382/203 |
| 2016/0379145 A1 | 12/2016 | Valentino, III | |
| 2017/0034483 A1* | 2/2017 | Aghdasi | G06F 16/78 |
| 2017/0301203 A1 | 10/2017 | Matsuura | |
| 2017/0308942 A1* | 10/2017 | Landers, Jr. | G06Q 30/0635 |
| 2018/0033232 A1 | 2/2018 | Carey | |
| 2019/0325681 A1 | 10/2019 | Bresson | |
| 2020/0285845 A1* | 9/2020 | Oami | G06V 40/10 |
| 2020/0349348 A1 | 11/2020 | Zhou | |
| 2020/0380252 A1 | 12/2020 | Ding | |

OTHER PUBLICATIONS

Intel; "Store Traffic Monitor Solution"; https://software.intel.com/en-us/iot/reference-implementations/store-traffic-monitor; Available as early as May 1, 2019; pp. 1-2.

IOmniscient; "iOmniscient Delivers AI-based, Multisensory, Smart Surveillance Analytics Powered by Intel Architecture"; https://software.intel.com/en-us/articles/iomniscient-delivers-ai-based-multisensory-smart-surveillance-analytics-powered-by-intel; Feb. 20, 2019; pp. 1-16.

Muralidharan, K. et al.; "Deep Neural Networks for Video Surveillance: A Review"; International Journal of Computer Science & Communication Networks; Vo. 7, No. 4, Aug.-Sep. 2017; pp. 102-108.

Nikouei, Seyed Yahya et al.; "Smart Surveillance as an Edge Network Service: from Harr-Cascade, SVM to a Lightweight CNN"; https://arxiv.org/abs/1805.00331; Apr. 24, 2018; pp. 1-10.

Rosebrock, Adrian; "Intersection over Union (IoU) for Object Detection"; https://www.pyimagesearch.com/2016/11/07/intersection-over-union-iou-for-object-detection/; Nov. 7, 2016; pp. 1-32.

Standard Cognition; "AI-Powered Checkout"; https://standard.ai; Available as early as Apr. 30, 2019; pp. 1-6.

Tian, Ying-Li et al.; "IBM Smart Surveillance System (E3): Event Based Video Surveillance System with an Open and Extensible Framework"; Special Issue of Machine Vision and Applications Journal; http://citeseerx.ist.psu.edu/viewdoc/download?doi=10.1.1.471.3230&rep=rep1&type=pdf; available at least as early as Apr. 2019; pp. 1-30.

USPTO; U.S. Appl. No. 16/888,321; Notice of Allowance and Fees Due (PTOL-85) dated Apr. 11, 2022; (13 pages).

USPTO; U.S. Appl. No. 16/888,321; Office Action dated Oct. 7, 2021; (27 pages).

* cited by examiner

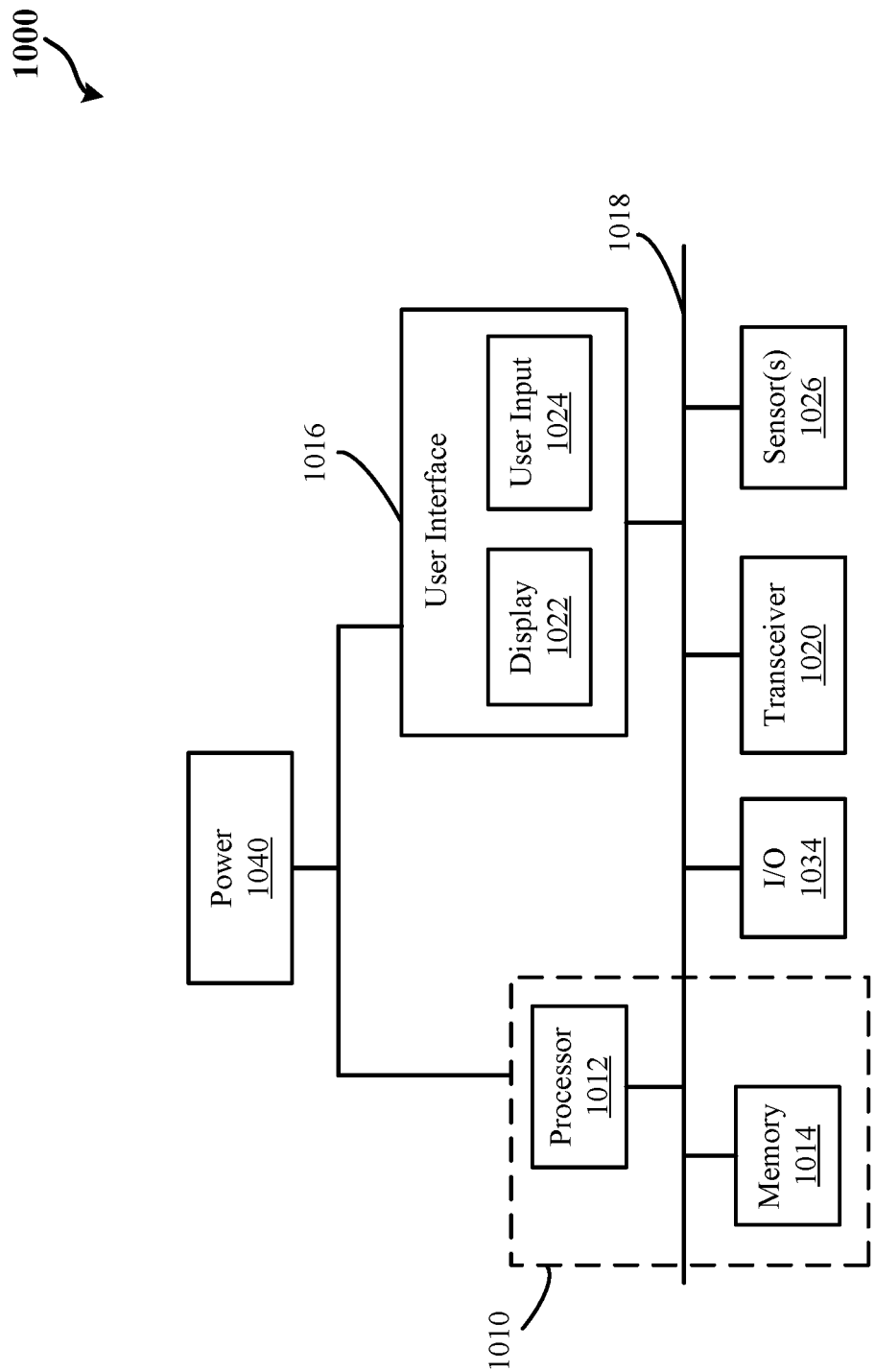

SYSTEMS AND METHODS FOR DETECTING INBOUND AND OUTBOUND TRAFFIC AT A FACILITY

CROSS-REFERENCE TO RELATED APPLICATIONS

This application is a continuation of U.S. application Ser. No. 16/888,321 filed May 29, 2020, which claims the benefit of U.S. Provisional Application No. 62/854,227 filed May 29, 2019, U.S. Provisional Application No. 62/854,242 filed May 29, 2019, and U.S. Provisional Application No. 62/854,251 filed May 29, 2019, all of which are incorporated herein by reference in their entirety.

TECHNICAL FIELD

This invention relates generally to monitoring of an area at a retail facility.

BACKGROUND

Generally, retail facilities have multiple cameras distributed throughout the building. Each video camera captures monitored video footages of an area. The store generally hires an associate to watch the real-time video footage or just record the captured video footages for replay at a later time. Generally, the captured monitored video footages are too grainy and pixilated to be used for any meaningful automatic monitoring.

BRIEF DESCRIPTION OF THE DRAWINGS

Disclosed herein are embodiments of systems, apparatuses and methods pertaining to detecting and tracking humans on each frame of a video footage using a neural network model to detect egress at an entrance at a retail facility, count humans/people at an area of a retail facility over a period of time, and determine a count of humans/people at a retail facility. This description includes drawings, wherein:

FIG. 10 illustrates an exemplary system for use in implementing methods, techniques, devices, apparatuses, systems, servers, sources and detection and tracking, in accordance with some embodiments.

Figure 1:
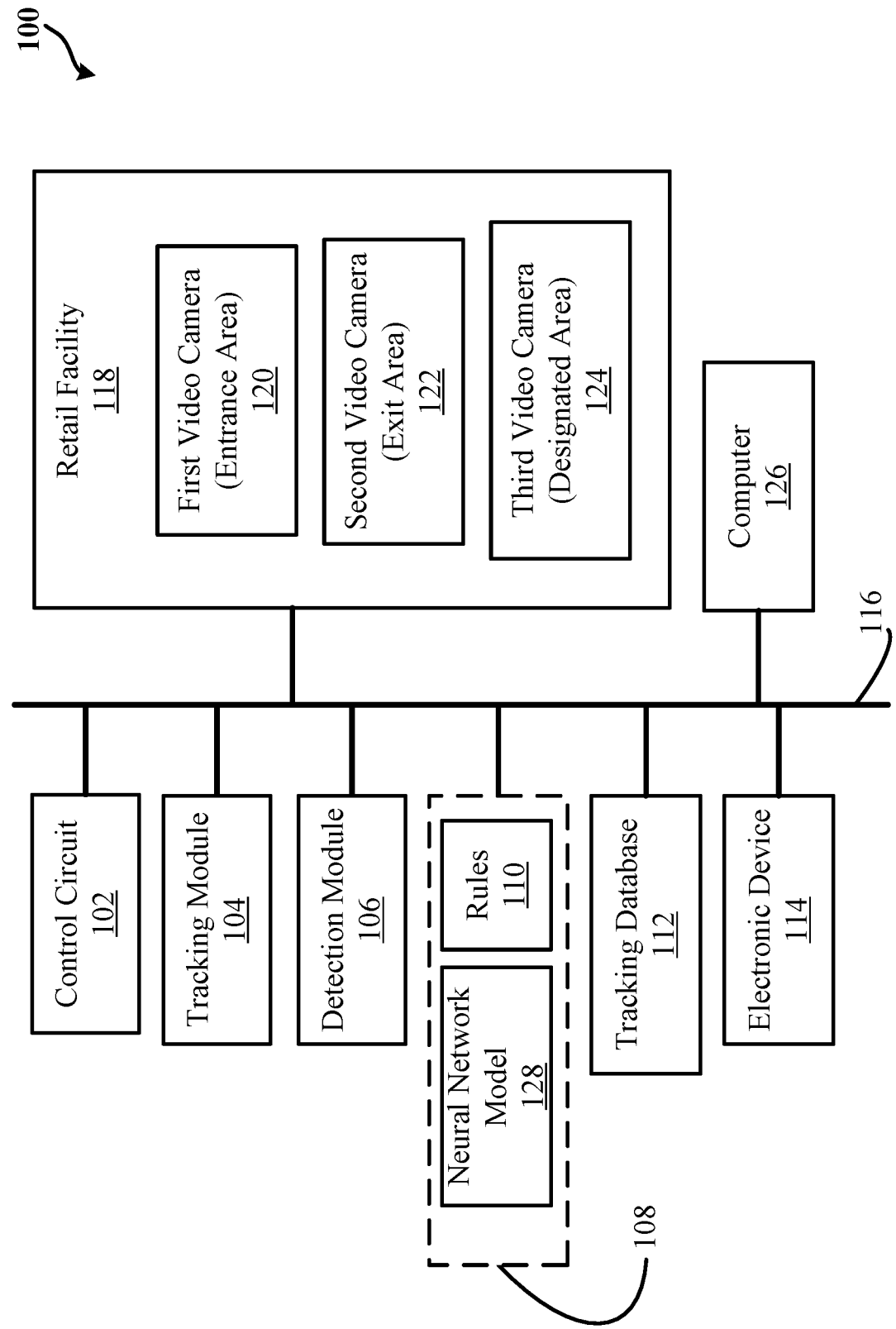
FIG. 1 illustrates a simplified block diagram of an exemplary system for detecting and tracking humans on each frame of a video footage using a neural network model in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for detecting egress at an entrance of a retail facility, counting humans/people at an area of a retail facility over a period of time, and determining a count of humans/people at a retail facility. In some embodiments, a system for detecting egress at an entrance of a retail facility includes a video camera mounted and arranged to capture video footage of the entrance area in real time. In one configuration, the entrance area is not intended to be an exit. In another configuration, the video camera may include a low resolution camera capturing images at less than 800 pixels by 600 pixels. In some implementation, the system may include a computer at the retail facility and coupled to the video camera. By one approach, the computer may receive the video footage from the video camera. In one scenario, the computer may be coupled to a network.

In one configuration, the system may include a control circuit coupled to the network. For example, the control circuit may be at a central location remote from the retail facility. By one approach, the control circuit may receive the live video footage from the computer via the network. In some implementations, the control circuit may detect, for each of a plurality of frames of the video footage and using a human detection module including a neural network model, a human and estimate a location of the human within a first region, a second region and/or a third region of the entrance area. In one example, the first region may correspond to a region inside of a doorway of the entrance area. Alternatively or in addition to, the second region may correspond to a region proximate the doorway. Alternatively or in addition to, the third region may correspond to a region outside of the doorway and further out the doorway than the second region. By one approach, the neural network model may be trained using stored footage from one of the video camera and a similar video camera having similar resolution and point of view. Alternatively or in addition to, the control circuit may track, over the plurality of frames of the video footage and using a human tracking module according to a set of rules, a location of a detected human, and/or movement of the detected human relative to the first region, the second region and the third region. By one approach, the control circuit may determine that the detected human has moved from the first region to the second region and to the third region. In such an approach, the control circuit may transmit an alert message that indicates that the human has exited the retail facility through the entrance area. For example, the alert message may include a camera identifier, a store identifier and/or an image capture of the detected human.

In some embodiments, a method for use in counting humans at an area of a retail facility over a period of time includes capturing, by a video camera mounted and arranged to capture, video footage of an entrance area of a retail facility in real time. For example, the video camera may include a low resolution camera capturing images at less than 800 pixels by 600 pixels. By one approach, the method may include receiving, by a computer at the retail facility and coupled to the video camera via a network, video footage from the video camera. Alternatively or in addition to, the method may include receiving, by a control circuit coupled to the network and at a central location remote from the retail facility, the live video footage from the computer. In one configuration, the method may include detecting a human and estimating, by the control circuit for each of a plurality of frames of the video footage and using a human detection module comprising a neural network model, a location of the human within at least one of a first region, a second region and a third region of the entrance area. For example, the first region may correspond to a region inside of a doorway of the entrance area. Alternatively or in addition to, the second region may correspond to a region proximate the doorway. Alternatively or in addition to, the third region may correspond to a region outside of the doorway and further out the doorway than the second region. By one approach, the neural network model may be trained using stored footage from one of the video camera and a similar video camera having similar resolution and point of view.

In some implementation, the method may include tracking, by the control circuit, over the plurality of frames of the video footage and using a human tracking module according to a set of rules, a location of a detected human, and/or movement of the detected human relative to the first region, the second region and/or the third region. Alternatively or in addition to, the method may include determining, by the control circuit, that the detected human has moved from the first region to the second region and to the third region. Alternatively or in addition to, the method may include transmitting, by the control circuit, an alert message that indicates that the human has exited the retail facility through the entrance area. For example, the alert message may include a camera identifier, a store identifier and/or an image capture of the detected human.

In some embodiments, a system for use in counting humans at an area of a retail facility over a period of time includes a video camera mounted and arranged to capture video footage of an area of a retail facility in real time. By one approach, the video camera may include a low resolution camera capturing images at less than 800 pixels by 600 pixels. In one configuration, the system may include a computer at the retail facility that is coupled to the video camera. By one approach, the computer may receive the video footage from the video camera. In one scenario, the computer may be coupled to a network. In some configuration, the system may include a control circuit coupled to the network. By one approach, the control circuit may be at a central location remote from the retail facility. For example, the control circuit may receive the live video footage from the computer via the network. Alternatively or in addition to, the control circuit may detect, for each of a plurality of frames of the video footage and using a human detection module including a neural network model, humans and estimate locations of the detected humans within the area. By one approach, the neural network model may be trained using a database of stored footage from one of the video camera and a similar video camera having similar resolution and point of view. Alternatively or in addition to, the control circuit may assign an identifier to each detected human. By one approach, the control circuit may define a count as a total number of identified and the detected humans.

Alternatively or in addition to, the control circuit may track, over the plurality of frames of the video footage spanning the period of time and using a human tracking module according to a set of rules, the location of each identified and detected human and movement of each identified and detected human within the area. By one approach, the control circuit may track by comparing detected humans in each frame to identified and detected humans from a previous frame. In one configuration, for detected humans having a similarity score corresponding to a previously identified and detected human, the control circuit may not increment the count. In another configuration, for detected humans having a similarity score not corresponding to a previously identified and detected human, the control circuit may assign a new identifier and increment the count. In yet another configuration, for previously identified and detected humans that do not have a similarity score corresponding to any of the detected humans of the current frame, the control circuit may decrement the count. Alternatively or in addition to, the control circuit may transmit, at a conclusion of the plurality of frames, an alert message that indicates a value of the count. For example, the alert message may include a store identifier, a camera identifier, and/or an area identifier.

In some embodiments, a method for use in counting humans at an area of a retail facility over a period of time includes capturing, by a video camera mounted and arranged to capture, video footage of an area of a retail facility in real time. For example, the video camera may include a low resolution camera capturing images at less than 800 pixels by 600 pixels. By one approach, the method may include receiving, by a computer at the retail facility and coupled to the video camera via a network, the video footage from the video camera. Alternatively or in addition to, the method may include receiving, by a control circuit coupled to the network and at a central location remote from the retail facility, the live video footage from the computer. In one configuration, the method may include detecting, by the control circuit, for each of a plurality of frames of the video footage and using a human detection module including a neural network model, humans and estimating locations of the detected humans within the area. By one approach, the neural network model may be trained using a database of stored footage from one of the video camera and a similar video camera having similar resolution and point of view. Alternatively or in addition to, the method may include assigning, by the control circuit, an identifier to each detected human. Alternatively or in addition to, the method may include defining, by the control circuit, a count as a total number of identified and the detected humans.

In some implementations, the method may include tracking, by the control circuit, over the plurality of frames of the video footage spanning the period of time and using a human tracking module according to a set of rules, the location of each identified and detected human and/or movement of each identified and detected human within the area. In such an implementation, the method including tracking by the control circuit may include comparing detected humans in each frame to identified and detected humans from a previous frame. In one configuration, for detected humans having a similarity score corresponding to a previously identified and detected human, the method may include not incrementing the count. In another configuration, for detected humans having a similarity score not corresponding to a previously identified and detected human, the method may include assigning a new identifier and incrementing the count. In yet another configuration, for previously identified and detected humans that do not have a similarity score corresponding to any of the detected humans of the current frame, the method may include decrementing the count. Alternatively or in addition to, the method may include transmitting, by the control circuit, at a conclusion of the plurality of frames, an alert message that indicates a value of the count. By one approach, the alert message may include a store identifier, a camera identifier, and/or an area identifier.

In some embodiments, a system for use in determining a count of people at a retail facility includes a first video camera mounted and arranged to capture a first video footage of an entrance area of a retail facility in real time. By one approach, the entrance area is not intended to be an exit. For example, the first video camera may include a first low resolution camera capturing images at less than 800 pixels by 600 pixels. In one configuration, the system may include a second video camera mounted and arranged to capture a second video footage of an exit area of the retail facility in real time. By one approach, the exit area is not intended to be an entrance. For example, the second video camera may include a second low resolution camera capturing images at less than 800 pixels by 600 pixels. Alternatively or in addition to, the system may include a computer at the retail facility that is coupled to the first and second video cameras. By one approach, the computer may receive the first and second video footages from the first and second video cameras. In one configuration, the computer may be coupled with a network. Alternatively or in addition to, the system may include a control circuit coupled to the network. For example, the control circuit may be at a central location remote from the retail facility. By one approach, the control circuit may receive the live video footage from the computer via the network. In such an approach, the control circuit may detect, for each of a plurality of frames of the first and second video footages and using a human detection module including a neural network model, one or more humans and estimate locations of the one or more humans within at least one of a first region, a second region and a third region of the entrance area and the exit area. In one configuration, the first region may correspond to a region inside of a corresponding doorway of the entrance area and the exit area. In another configuration, the second region may correspond to a region proximate the corresponding doorway. In yet another configuration, the third region may correspond to a region outside of the corresponding doorway and further out the doorway than the second region. By one approach, the neural network model may be trained using stored footage from one of the first video camera, the second video camera, and a similar video camera having similar resolution and point of view.

In some implementations, the control circuit may track, over the plurality of frames of the video footage and using a human tracking module according to a set of rules, a location of a detected human, and/or movement of the detected human relative to the first region, the second region and/or the third region. Alternatively or in addition to, the control circuit may determine that the detected human has moved from the first region to the second region and to the third region and, in response, increment an outbound value. Alternatively or in addition to, the control circuit may determine that the detected human has moved from the third region to the second region and to the first region and, in response, increment an inbound value. Alternatively or in addition to, the control circuit may subtract the outbound value from the inbound value to determine a count of people inside the retail facility. By one approach, the control circuit may store the count over a period of time to a database coupled to the control circuit. In one configuration, the control circuit may cause an electronic device to display the count.

In some embodiments, a method for use in determining a count of people at a retail facility includes capturing, by a first video camera mounted and arranged to capture, a first video footage of an entrance area of a retail facility in real time. By one approach, the entrance area is not intended to be an exit. In one configuration, the first video camera may include a first low resolution camera capturing images at less than 800 pixels by 600 pixels. In some implementation, the method may include capturing, by a second video camera mounted and arranged to capture, a second video footage of an exit area of the retail facility in real time. For example, the exit area may not be intended to be an entrance. In one configuration, the second video camera may include a second low resolution camera capturing images at less than 800 pixels by 600 pixels. Alternatively or in addition to, the method may include receiving, by a computer at the retail facility and coupled to the first and second video cameras via a network, the first and second video footages from the first and second video cameras. Alternatively or in addition to, the method may include receiving, by a control circuit coupled to the network and at a central location remote from the retail facility, the live video footage from the computer. By one approach, the method may include detecting, by the control circuit, for each of a plurality of frames of the first and second video footages and using a human detection module including a neural network model, one or more humans and estimating locations of the one or more humans within at least one of a first region, a second region and a third region of the entrance area and the exit area. In one configuration, the first region may correspond to a region inside of a corresponding doorway of the entrance area and the exit area. In another configuration, the second region may correspond to a region proximate the corresponding doorway. In yet another configuration, the third region may correspond to a region outside of the corresponding doorway and further out the doorway than the second region. By one approach, the neural network model may be trained using stored footage from one of the first video camera, the second video camera, and a similar video camera having similar resolution and point of view.

Alternatively or in addition to, the method may include tracking, by the control circuit over the plurality of frames of the video footage and using a human tracking module according to a set of rules, a location of a detected human, and/or movement of the detected human relative to the first region, the second region and/or the third region. Alternatively or in addition to, the method may include determining, by the control circuit, that the detected human has moved from the first region to the second region and to the third region and, in response, incrementing an outbound value. By one approach, the method may include determining, by the control circuit, that the detected human has moved from the third region to the second region and to the first region and, in response, incrementing an inbound value. In one configuration, the method may include subtracting, by the control circuit, the outbound value from the inbound value to determine a count of people inside the retail facility. Alternatively or in addition to, the method may include storing, by the control circuit, the count over a period of time to a database coupled to the control circuit. By one approach, the method may include causing, by the control circuit, an electronic device to display the count.

In some embodiments, the systems and methods may be configured to comply with privacy requirements which may vary between jurisdictions. For example, before any recording, collection, capturing or processing of user images (e.g., video image, video footage, etc.), a "consent to capture" process may be implemented. In such a process, consent may be obtained, from a user (e.g., customers, associates, and/or individuals entering and/or exiting the retail facility), via a registration process. Part of the registration process may be to ensure compliance with the appropriate privacy laws for the location where services may be performed and/or transactions that may take place. In some embodiments, the registration process may include certain notices and/or disclosures made to the user prior to the user recording the user's consent. In some embodiments, no unauthorized collection or processing of images of individuals occurs via exemplary systems and methods.

After registration, and before collection or processing of images of the user occurs, in some embodiments, a verification of the user as registered with the system and providing the required consents may occur. That is, the user's registration status as having consented to the collection of images may be verified prior to collecting any images. In such an embodiment, this verification may take place, for example, by the user entering a PIN (Personal Identification Number), password, or other code into a keypad or keyboard; by the user entering into a limited geofence location while carrying a fob, mobile device (such as a smartphone), or other RF transmitter, where the device has been configured to broadcast an authorization signal.

By one approach, once consent is verified, the images of the user may be captured, processed and/or used. In one configuration, absent verification of consent, the camera, sensor, and/or other image data collection system may remain turned off. In another configuration, once consent is verified, the video camera, sensor and/or other image data collection system may be activated or turned on. In such a configuration, if any image is inadvertently collected from the user prior to verification of consent it may be immediately deleted, not having been saved to disk.

In some implementations, any images captured as part of the verification process may be handled and/or stored by a single party at a single location. By one approach, where data may be transmitted to an offsite location for verification, certain disclosures prior to consent may be required, and the images may be encrypted. The hashing of the images captured and/or received may be in a form of asymmetrical encryption which improves both data security and privacy, as well as reducing the amount of data which needs to be communicated.

In an illustrative non-limiting example, a retail facility may have one or more video cameras distributed throughout the retail facility. In one example, one or more video cameras may capture video footage of an area inside, outside, and/or around the retail facility. By one approach, the area may include an entrance area, an exit area, an area within and/or inside the retail facility, a customer service counter, a membership counter, a checkout station, and/or a cafeteria, among other areas in the retail facility that tend to service, cater, and/or address customer questions, concerns, purchases, and/or inquiries. In some embodiments, one or more video cameras may capture video footage of an entrance area, an exit area, and/or an area within and/or inside the retail facility for over a period of time. By one approach, the entrance area and/or the exit area may be unguarded and/or unmanned. As such, a video camera may be capture video footages of people walking into and/or out of the retail facility at the entrance area and/or at the exit area. Additionally, a video camera may capture video footages in one or more areas within the retail facility. In some embodiments, in cooperation with a control circuit operating in a neural network configuration and/or architecture, the captured video footages may be used to detect egress at an entrance area of a retail facility, count humans/people at an area inside the retail facility, and determine a count of humans/people inside the retail facility at a particular period of time. The embodiments described herein include video cameras having video images and/or frames that are of low resolution (e.g., an image having a frame that is equal to or less than 800 pixels by 600 pixels). However, a person of ordinary skill in the art may determine that the embodiments described herein may equally be applicable to a video camera with higher resolution than 800 pixels by 600 pixels. At least one benefit in using the embodiments described herein with the video cameras that have low resolution is that majority of retail facilities have low resolution video cameras and applying the embodiments described herein with an already existing and/or installed video cameras will result in cost savings to retailers since no video cameras and/or cables/accessories change-out are needed. Thus, a robust detection and tracking of humans in the retail facility is still achieved even with low resolution video cameras. As such, by applying the embodiments herein with existing video cameras in a retail facility, a retailer may retrofit its existing video monitoring system with a more robust video monitoring system that ensures an accurate detection and tracking of humans and/or carts for a fraction of a cost that the retailer would have incurred with a nearly or complete overhaul or upgrade of its existing video monitoring system to a video monitoring system with higher resolution video cameras.

To illustrate, FIGS. 1-10 are described herein. For example, FIGS. 7, 8A, 8B, 9A, and 9B show flow diagrams of exemplary processes and/or methods 700, 800, and 900 of detecting egress at an entrance area of a retail facility, counting humans at an area of a retail facility over a period of time, and determining a count of people at a retail facility, respectively, in accordance with some embodiments. FIGS. 7, 8A, 8B, 9A, and 9B are described concurrently with one or more of the remaining figures. For example, FIG. 1 illustrates a simplified block diagram of an exemplary system 100 for detecting and tracking humans on each frame of a video footage using a neural network model in accordance with some embodiments. The system 100 includes a control circuit 102, a tracking module 104, and a detection module 106. By one approach, the tracking module 104 and/or the detection module 106 may be instruction codes stored in a memory 108 executable by the control circuit 102. By another approach, the tracking module 104 and/or the detection module 106 may include other control circuits working cooperatively with the control circuit 102. In some implementation, the system 100 may include one or more video cameras 120, 122, 124 mounted and arranged to capture video footages at a retail facility 118. By one approach, the one or more video cameras 120, 122, 124 may include a low resolution camera capturing images at less than 800 pixels by 600 pixels. By another approach, the one or more video cameras 120, 122, 124 may include cameras having a resolution that may include 352 pixels by 240 pixels, 640 pixels by 480 pixels, 720 pixels by 576 pixels, 1280 pixels by 720 pixels, 1280 pixels by 960 pixels, 1920 pixels by 1080 pixels, etc. For example, a first video camera 120 may capture video footage of an entrance area of the retail facility 118, at step 702 and/or step 902. In such an example, the entrance area is not intended to be an exit. In another example, a second video camera 122 may capture video footage of an exit area of the retail facility 118, at step 904. In such an example, the exit area is not intended to be an entrance. In yet another example, a third video camera 124 may capture video footage of an area and/or designated area inside the retail facility 118, at step 802. By one approach, the designated area may include a customer service counter, a membership counter, a checkout station, and/or a cafeteria, among other areas inside the retail facility 118. In some implementation, a computer 126 at the retail facility 118 may receive the video footages from the one or more video cameras 120, 122, 124, at step 704, 804, and/or 906. In some embodiments, a low-resolution camera may include a video camera that provides an image/frame having less than half the number of pixels of what is conventionally considered as a high-resolution camera.

In one configuration, the control circuit 102 at a central location remote from the retail facility 118 may receive live video footage from the computer 126 via a network 116, at step 706, 806, and/or 908. By one approach, the system 100 may include a tracking database 112 storing a plurality of identifiers each associated with one of detected human and tracked human on each frame that is processed and/or evaluated by the control circuit 102, the tracking module 104, and/or the detection module 106. For example, the tracking database 112 may be coupled to the control circuit 102 and store the plurality of identifiers each associated with one of detected human and tracked human on each current frame that is currently being processed by the control circuit 102 for each of a plurality of retail facilities. In one configuration, one or more of the plurality of identifiers may be associated with a detected human and a tracked human on one or more of a plurality of retail facilities. In another configuration, the plurality of identifiers may include bounding boxes associated with detected humans and tracked humans in the plurality of retail facilities. Alternatively or in addition to, the tracking database 112 may include x,y coordinates of each center of the stored bounding boxes that enables the control circuit 102 to determine a trajectory path of each stored bounding boxes. For example, the control circuit 102 may determine a trajectory path based on a determination of an x,y coordinates of a center of a stored bounding box and a current x,y coordinates of the center of the same bounding box. By one approach, the system 100 may include a set of rules 110. For example, the set of rules 110 may include at least two preset horizontal thresholds in a frame of a video footage. By one approach, the at least two preset horizontal thresholds may be determined based on the video camera capturing the video footage and the entrance area and/or the exit area. In some implementations, the control circuit 102 in cooperation with the tracking module 104 may track humans in accordance with the set of rules 110. In one scenario, the set of rules 110 may be stored in the memory 108 and accessible to the control circuit 102 and/or the tracking module 104. In one configuration, the system 100 may include an electronic device 114 coupled to the control circuit 102 via the network 116. In some implementations, the electronic device 114 may include a smartphone, a laptop, a table, a wearable electronic device, among other electronic devices that are portable.

By one approach, the control circuit 102 may use a neural network model and, in cooperation with the detection module 106 and the tracking module 104, perform simultaneous (and/or prior to subsequent frame) detection and tracking on each frame of one or more video footages captured by a first video camera 120, a second video camera 122, and/or a third video camera 124 of a retail facility 118. In some implementations, the neural network model may be based at least in part on training a neural network (e.g., deep neural network, lightweight neural network, a lightweight convolutional neural network, a lightweight MobileNet, GoogleNet, Visual Geometry Group, and/or the like) using stored footage from one of the one or more video cameras 120, 122, 124 and a similar video camera having similar resolution and point of view. For example, the control circuit 102 may receive a video footage and evaluate each frame of the video footage to detect and track one or more humans in the frame. For example, the control circuit 102 in cooperation with the detection module 106 may perform detection of a human in a frame. Additionally, the control circuit 102 in cooperation with the tracking module 104 may perform tracking of a human in the same frame. As such, the control circuit 102 performs separate detection and tracking on the same frame, which is in contrast to conventional systems that perform detection only in one frame and then perform tracking only on a predetermined subsequent frames before performing another detection on a following frame. As a result of simultaneous detection and tracking on the same frame, misdetection and/or mis-tracking are substantially and/or significantly reduced compared to those of the conventional systems.

Figure 4:
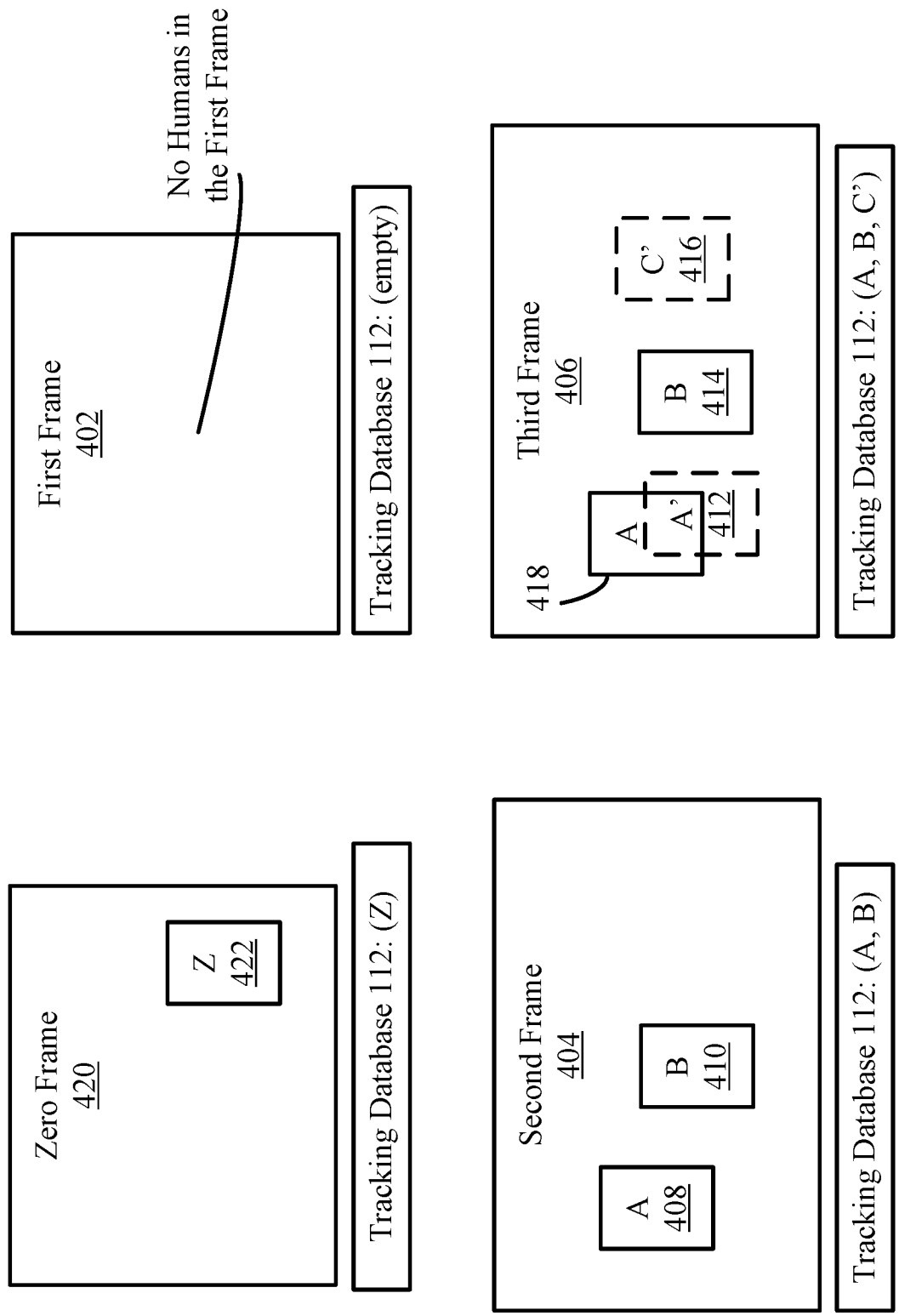
FIG. 4 illustrates a simplified schematic illustration of an exemplary detection and tracking on each frame in accordance with some embodiments.

To illustrate, FIG. 4 illustrates a simplified schematic illustration of an exemplary detection and tracking on each frame in accordance with some embodiments. The one or more video cameras 120, 122, 124 may capture a video footage of an area (e.g., an exit area, an entrance area, and/or an area within the retail facility 118). For example, the third video camera 124 may capture a video footage of a designated area in the retail facility 118. In one configuration, in a first frame 402 of the video footage, there are no humans in the area. By one approach, during a first time the control circuit 102 is evaluating the first frame 402, the tracking database 112 may not have an identifier listed and/or stored since there are no humans to detect and track in the first frame 402. By another approach, during a second time the control circuit 102 is evaluating a second frame 404 of the video footage, the detection module 106 may detect human A and create a bounding box A 408 to correspond to the detected human A. In one configuration, the detection module 106 may detect human B and create a bounding box B 410 to correspond to the detected human B. In one configuration, while the detection module 106 is performing detection, the tracking module 104 may access the tracking database 112 and find that there are no humans to track since there are no corresponding bounding boxes stored in the tracking database 112. Subsequently, the control circuit 102 may calculate Intersection over Union (IoU) of bounding boxes created by the detection module 106 with bounding boxes created by the tracking module 104. In one scenario, during the second frame 404, there are no bounding boxes created by the tracking module 104 since there are no humans to track from the first frame 402. In such a scenario, the control circuit 102 and/or the detection module 106 may cause the tracking database 112 to store the bounding box A 408 and the bounding box B 410.

By another approach, during a third time the control circuit 102 is evaluating a third frame 406 of the video footage, the detection module 106 may detect a human A' and create a bounding box A'412 to correspond to the detected human A'. In one configuration, the detection module 106 may detect a human C' and create a bounding box C'416 to correspond to the detected human C'. In another configuration, while the detection module 106 is performing detection, the tracking module 104 may access the tracking database 112 and determine that there are previously detected humans to track based on the stored bounding boxes A 408 and B 410. By one approach, each stored bounding boxes in the tracking database 112 may be associated with a corresponding x,y coordinates and/or a location in a frame. In one configuration, in response to a determination that there are previously detected humans to track, the tracking module 104 may perform tracking of the previously detected humans.

For example, based on the corresponding location of the stored bounding box A 408, the tracking module 104 may perform detection within a first area in the third frame 406 that is close to the corresponding location of the stored bounding box A 408. In such example, when the tracking module 104 detects a first human in the first area, the tracking module 104 may create an intermediate bounding box to correspond to the first human detected in the first area. In response, the tracking module 104 may correlate the intermediate bounding box with the stored bounding box A 408 by calculating a correlation value and/or determining whether the correlation value is greater than a correlation threshold (e.g., the correlation threshold may include a predetermined correlation threshold by a retailer, an industry standard, and/or the highest value relative to the other values being calculated for a particular bounding box, to name a few). By one approach, when the correlation value is greater than the correlation threshold, the tracking module 104 may merge the stored bounding box A 408 with the intermediate bounding box resulting in a new bounding box A 418. By another approach, when the correlation value is less than or equal to the correlation threshold, the tracking module 104 and/or the control circuit 102 may calculate the Intersection over Union (IoU) of the intermediate bounding box with each of the bounding box A'412 and the bounding box C'416.

In another example, based on the corresponding location of the stored bounding box B 410, the tracking module 104 may perform detection within a second area in the third frame 406 that is close to the corresponding location of the stored bounding box B 410. In such example, when the tracking module 104 detects a second human in the second area, the tracking module 104 may create a second intermediate bounding box to correspond to the second human detected in the second area. In response, the tracking module 104 may correlate the second intermediate bounding box with the stored bounding box B 410 by calculating a second correlation value and/or determining whether the second correlation value is greater than the correlation threshold. By one approach, when the second correlation value is greater than the correlation threshold, the tracking module 104 may merge the stored bounding box B 410 with the second intermediate bounding box resulting in a new bounding box B 414.

Alternatively or in addition to, the control circuit 102 may determine an overlap between each of the bounding boxes A' 412 and C' 416 created by the detection module 106 with each of the bounding boxes A 418 and B 414 created by the tracking module 104. By one approach, the control circuit 102 may determine the overlap based on a calculation of the IoU. In one scenario, when the calculated IoU is greater than an IoU threshold (e.g., the IoU threshold may include a predetermined IoU threshold by a retailer, an industry standard, to name a few), the control circuit 102 may determine that the bounding boxes correspond to the same human. In some implementations, the IoU threshold may include 0.7. In such implementations, the IoU threshold of 0.7 may provide a better determination of an overlap to determine that two bounding boxes correspond to the same human relative to other values in the range of 0.5 to 0.95. For example, the control circuit 102 may determine a first IoU of the bounding boxes A 418 and A' 412 by determining an area of intersection of the bounding box A 418 with the bounding box A' 412 and divide the result by an area of union of the bounding box A 418 and the bounding box A' 412. By one approach, when the first IoU is greater than the IoU threshold, the control circuit 102 may determine that the bounding box A 418 and the bounding box A' 412 correspond to the same human. In such an approach, the control circuit 102 may eliminate and/or remove the bounding box A' 412 from the tracking database 112 and retain the bounding box A 418 in the tracking database 112. In one configuration, each time a bounding box is created by the tracking module 104 and/or the detection module 106, the control circuit 102 may cause the tracking database 112 to store the created bounding box. In one scenario, a newly stored bounding may then be subsequently eliminated and/or removed from the tracking database 112 based on a result of a correlation and/or overlap determination as described above.

Alternatively or in addition to, when the calculated IoU is less than or equal to the IoU threshold, the control circuit 102 may determine that the bounding boxes correspond to two different humans. For example, the control circuit 102 may determine a second IoU of the bounding boxes B 414 and C' 416 by determining an area of intersection of the bounding box B 414 with the bounding box C' 416 and divide the result by an area of union of the bounding box B 414 and the bounding box C' 416. By one approach, when the second IoU is less than or equal to the IoU threshold, the control circuit 102 may determine that the bounding box B 414 and the bounding box C' 416 correspond to two different humans. In such an approach, the tracking database 112 may store the bounding box B 414 and the bounding box C' 416.

Alternatively or in addition to, the control circuit 102 may determine that there is no overlap between the bounding box A' 412 and the bounding box B 414 based on a calculation of the IoU between the bounding box A' 412 and the bounding box B 414. In response, the control circuit 102 may determine that the bounding box A' 412 and the bounding box B 414 each correspond to a different human. In one configuration, the control circuit 102 may determine that the bounding box A' 412 and the bounding box A 418 correspond to the same human based on a determination of an overlap corresponding to an IoU that is greater than the IoU threshold. In another configuration, the control circuit 102 may determine that the bounding box C' 416 does not have overlap corresponding to an IoU that is greater than the IoU threshold with either bounding box A 418 or bounding box B 414. In such a configuration, the control circuit 102 may cause the tracking database 112 to store the bounding box C' 416 indicating that an additional human is now present in the third frame 406. In another configuration, in response to the determination that the bounding box A' 412 and the bounding box B 414 each correspond to a different human while the bounding box A' 412 and the bounding box A 418 correspond to the same human, the control circuit 102 may cause the tracking database 112 to store the bounding box A 418 and the bounding box B 414 indicating an updated location of the previously detected humans A and B. As such, at a conclusion of an evaluation of the third frame 406 by the control circuit 102, the tracking database 112 may store the bounding boxes A 418, B 414, and C' 416. In response, the control circuit 102 may determine that humans A, B, and C' are present in the area where the video footage including the third frame 406 is captured by at least one of the one or more video cameras 120, 122, 124.

Figure 2:
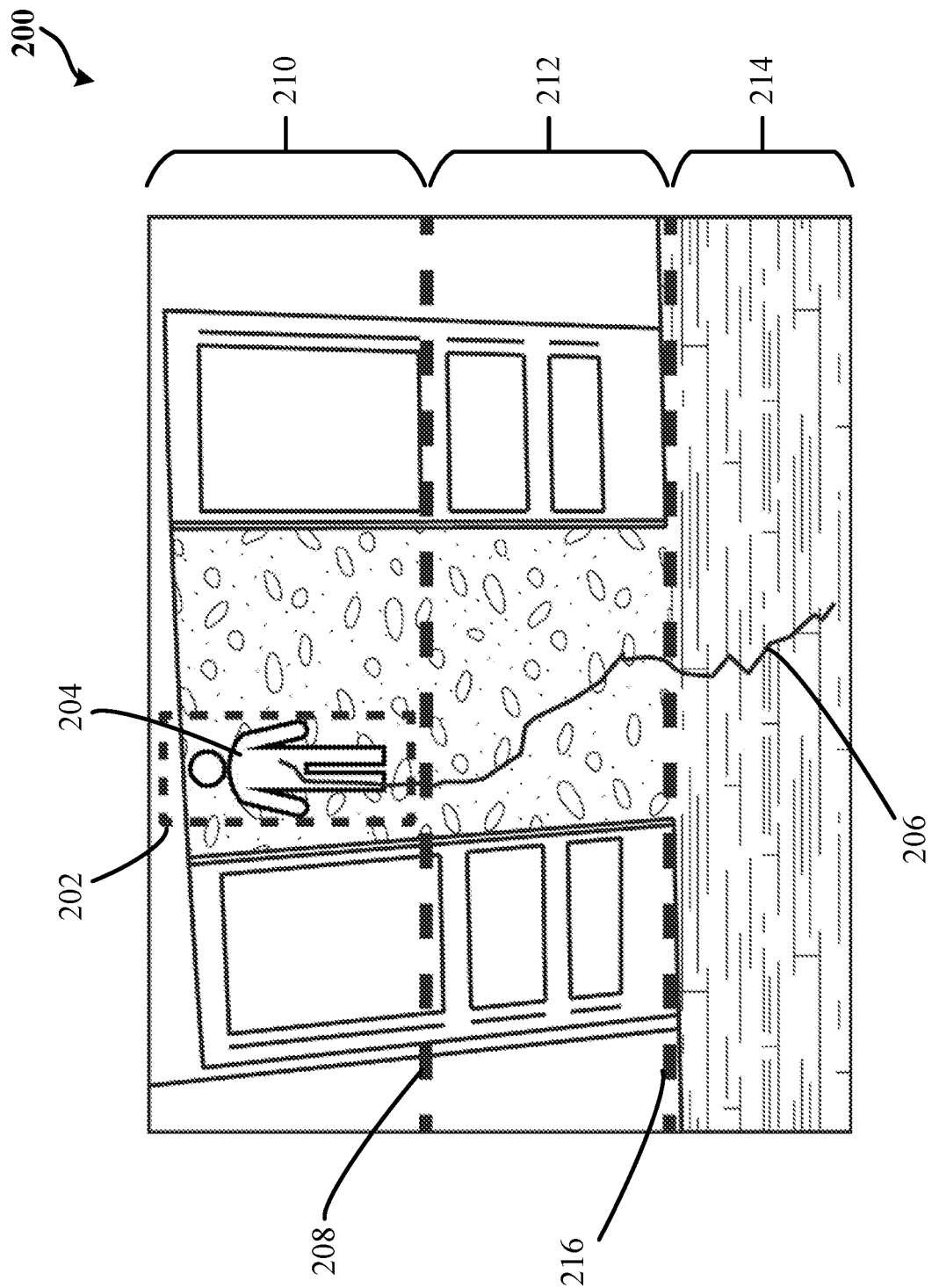
FIG. 2 is a simplified illustration of an exemplary frame of a video footage captured in an entrance area in accordance with some embodiments.

By one approach, the tracking database 112 may enable the system 100 and/or the control circuit 102 to determine at a particular point in time a count of humans and/or locations of humans in an area associated with at least one of the one or more video cameras 120, 122, 124. In one configuration, the control circuit 102 may determine a trajectory path of a detected human at an entrance area, an exit area, and/or an area within the retail facility 118 based on the tracking database 112. For example, based on the captured video footage, the control circuit 102 may track a trajectory path of a detected human based on a location of the detected human from one region of a frame to another region of a subsequent frame. To illustrate, FIG. 2 is described in combination with the descriptions provided for FIGS. 1 and 4 above. FIG. 2 is a simplified illustration of an exemplary frame 200 of a video footage captured in an entrance area in accordance with some embodiments. By one approach, the frame 200 may include a trajectory path 206 of a detected human 204 at an entrance area of the retail facility 118. In one configuration, the first video camera 120 may be mounted and arranged to capture video footage of an entrance area of the retail facility 118 in real time. In one scenario, the entrance area is not intended to be an exit. In one configuration, the first video camera 120 may include a low resolution camera capturing images at less than 800 pixels by 600 pixels.

In some implementations, the frame 200 of the video footage captured by the first video camera 120 may include a plurality of regions. By one approach, the frame 200 may be apportioned to a first region 214, a second region 212, and a third region 210. In such an approach, based on detecting and tracking the trajectory path of the detected human 204 over multiple frames captured by the first video camera 120, the control circuit 102 may determine that the detected human 204 is exiting the retail facility 118 through the entrance area. For example, the control circuit 102 may detect, for each of a plurality of frames of a video footage and using a human detection module (e.g., the detection module 106) including a neural network model 128 stored in the memory 108, a human 204 and estimate a location of the human 204 within at least one of the first region 214, the second region 212, and the third region 210 of the entrance area, at step 708. In one configuration, the first region 214 may correspond to a region inside of a doorway of the entrance area. Alternatively or in addition to, the second region 212 may correspond to a region proximate the doorway. Alternatively or in addition to, the third region 210 may correspond to a region outside of the doorway and further out the doorway than the second region 212. By one approach, the neural network model 128 may be based at least in part on the control circuit 102 being trained using stored video footage from the first video camera 120, the second video camera 122, the third video camera 124, a similar video camera having similar resolution and point of view, and/or neural network related hyperparameters (e.g., dropout rates, size of convolutional kernels, learning rates, momentum, batch size, and/or stopping conditions).

In some implementations, the control circuit 102 may track, over the plurality of frames of the video footage and using a human tracking module (e.g., the tracking module 104) according to the set of rules 110, a location of the detected human 204, and movement of the detected human 204 relative to the first region 214, the second region 212, and the third region 210, at step 710. By one approach, the set of rules 110 may include at least two preset horizontal thresholds 208, 216 determined based on the first video camera 120 and the entrance area associated with the first video camera 120. In such an approach, the first region 214, the second region 212, and the third region 210 of the frame 200 may be formed from the set of rules 110. In some implementations, the control circuit 102 may determine that the detected human 204 has moved from the first region to the second region and to the third region based on the set of rules 110 and/or a detection of the detection module 106 and a tracking of the tracking module 104, at step 712. In one scenario, the control circuit 102 may transmit an alert message that indicates that the human 204 has exited the retail facility 118 through the entrance area, at step 714. By one approach, the alert message may include a camera identifier, a store identifier an image capture of the detected human 204, and/or a timestamp corresponding to a time the human 204 exited the retail facility 118 through the entrance area.

In some implementation, the alert message may be received by the electronic device. In one scenario, the electronic device may be portable, for example, worn by an associate at the retail facility 118. In some configurations, the control circuit 102 may store the alert message over a period of time. For example, the memory 108 and/or other memories (e.g., hard disk drive, volatile memory, non-volatile memories, solid state drives, network drives, among other types of data storage drives and/or devices). In such configurations, a retailer may have a plurality of historical data corresponding to the alert messages transmitted over the period of time. By one approach, the control circuit 102 may determine a total count of alert messages over the period of time and/or determine whether the total count has reached a threshold value. In such an approach, the control circuit 102 may, in response to the total count reaching the threshold value, provide a notification message to the electronic device 114 indicating an assignment of an associate at the entrance area. For example, a retailer may, based on associate resources available at a particular of time and/or operational policy, may decide to have an unguarded entrance. In such an example, in response to the total count of humans exiting at the entrance area reaching the threshold value (e.g., the threshold value may include a value predetermined by an associate at the retail facility 118), the control circuit 102 may determine that an associate may be assigned at the entrance area. Alternatively or in addition to, the control circuit 102 may store occurrences of the alert message over a period of time and/or determine occurrences of shrinkage at the retail facility 118 over the period of time based on an access to the memory 108 and/or the other memories. By one approach, the control circuit 102 may correlate the occurrences of the alert message with the occurrences of shrinkage over the period of time. In such an approach, the control circuit 102 may determine one or more patterns based on the correlation to be provided to a retailer.

In some embodiments, the neural network model 128 may be determined by the control circuit 102 operating in a neural network configuration and/or architecture (e.g., deep neural network, lightweight neural network, a lightweight convolutional neural network, a lightweight MobileNet, GoogleNet, Visual Geometry Group, and/or the like) using stored video footage from the first video camera 120, the second video camera 122, the third video camera 124, and/or a similar video camera having similar resolution and point of view. For example, the control circuit 102 operating in the neural network configuration and/or architecture may receive one or more frames of a video footage as input. By one approach, the control circuit 102 may produce, based at least in part on the neural network model 128, an output including an identifier associated with each detected person in a frame. In one configuration, the identifier may include one or more sets of x,y coordinates corresponding to a location of the detected person in the frame. In some implementation, the identifier may include a bounding box (e.g., a bounding box 202 in the frame 200 of FIG. 2, the bounding box A 408 and the bounding box B 410 in the second frame 404 of FIG. 4, and the bounding box A 418 and the bounding box B 414 in the third frame 406 of FIG. 4). In one example, the x,y coordinate output of the control circuit 102 may include the x,y coordinates of each of left corners and each of right corners of the bounding box. In some embodiments, the control circuit 102 may be trained using a particular set of data based on a plurality of video footage corresponding to various retail facilities, time of day, among various conditions that a given retail facility at a given place and/or time may experience. By one approach, the control circuit 102 may be trained using the particular set of data to output the neural network model 128. In some embodiments, personal characteristics, traits, identifications, and/or the like are not determined by the control circuit 102, the tracking module 104, and the detection module 106 nor stored in the tracking database 112. As such, an identifier (e.g., a bounding box) described herein is an identifier corresponding to generic identification.

In some embodiments, as described in FIG. 4, the control circuit 102 may perform detection and tracking on the same frame to determine humans that are present on the frame. By one approach, the control circuit 102 may detect, for each of a plurality of frames of the video footage and using a human detection module (e.g., the detection module 106) including the neural network model 128, humans and estimate locations of the detected humans within an area, at step 808. In one scenario, the area may include an exit area, a cafeteria, a checkout station, a customer service area, among other areas in the retail facility 118. Alternatively or in addition to, the control circuit 102 may track, over the plurality of frames of the video footage spanning the period of time and using a human tracking module (e.g., the tracking module 104) according to the set of rules 110, the location of each identified and detected human and movement of each identified and detected human within the area, at step 814.

In one configuration, as previously described, the control circuit 102 may determine that humans A, B, and C' are present in the area based at least in part on an assignment of corresponding identifier to each detected human A, B, and C' and/or the evaluation of the third frame 406, at step 810. By one approach, the corresponding identifier of human A may include the bounding box A 418. By another approach, the corresponding identifier of human B may include the bounding box B 414. By another approach, the corresponding identifier of human C' may include the bounding box C' 416. In some implementations, the control circuit 102 may define a count as a total number of identified and detected humans in a particular period of time. Alternatively or in addition to, the control circuit 102 may define a count as a total number of identified and detected humans in a last frame of the particular period of time, at step 812. In an illustrative non-limiting example, the period of time may include one or more seconds, minutes, hours, and/or days. In such an example, the control circuit 102 may determine a count of humans in an area based on a number of bounding boxes stored in the tracking database 112 at the period of time and/or at a last frame of a video footage captured for the period of time. For example, a period of time may include every third frame in a video footage as shown in FIG. 4. In such an example, the control circuit 102 may compare detected humans in each frame (e.g., the third frame 406) to identify and detect humans from a previous frame (e.g., the second frame 404), at step 816. By one approach, for detected humans having a similarity score (e.g., the calculated IoU or overlap) corresponding to a previously identified and detected human (e.g., the bounding box A 418 and the bounding box A' 412 having a calculated IoU greater than the IoU threshold and/or the bounding box B 414 tracked by the tracking module 104 but not detected by the detection module 106), the control circuit 102 may not increment the count, at step 818. Alternatively or in addition to, for detected humans having a similarity score not corresponding to a previously identified and detected human (e.g., the bounding box C' 416 having a calculated IoU being less than or equal to the IoU threshold when each separately determined with the bounding box A 418 and the bounding box B 414), the control circuit 102 may assign a new identifier (e.g., the bounding box C' 416) and increment the count, at step 820. Alternatively or in addition to, for previously identified and detected humans that do not have a similarity score corresponding to any of the detected humans of the current frame, decrement the count, at step 822.

To illustrate, in FIG. 4, the detection module 106 may detect human Z in a zero frame 420 and create an identifier (e.g., a bounding box Z 422). By one approach, on the same zero frame 420, the tracking module 104 may access the tracking database 112 and find that there are no previously detected humans since there are no stored bounding boxes and/or identifiers in the tracking database 112. In such an approach, the control circuit 102 may determine that an IoU calculation of the bounding box Z 422 results in a zero value and/or a particular value indicating that human Z is initially detected in the zero frame 420. In one configuration, at the end of an evaluation of the zero frame 420, the tracking database 112 may store the identifier associated with the human Z (e.g., the bounding box Z 422). As such, in FIG. 4, the bounding boxes and/or identifiers shown next to the tracking database 112 indicate the bounding boxes and/or identifiers stored in the tracking database 112 at the end of the corresponding frame and/or prior to an evaluation of a subsequent frame. To continue the illustrative non-limiting example, a subsequent frame to the zero frame 420 is the first frame 402. By one approach, during the first frame 402, the tracking module 104 may determine whether the human Z is in an area in the first frame 402 that is proximate and/or within a predetermined distance from the location and/or the x,y coordinates associated with the bounding box Z 422. Simultaneously and/or at a time in close proximity with the tracking module 104 determining whether the human Z is in the area in the first frame 402, the detection module 106 may determine whether humans are in the first frame 402. In one configuration, the tracking module 104 may determine that the human Z is not in the first frame 402. As a result, the tracking module 104 may cause the tracking database 112 to remove and/or delete the bounding box Z 422 and/or the identifier associated with the human Z from storage. In another configuration, the detection module 106 may determine that there are no humans detected in the first frame 402. As such, at the end of the first frame 402, there are no bounding boxes and/or identifiers stored in the tracking database 112, as shown in FIG. 4. Thus, for previously identified and detected humans that do not have a similarity score corresponding to any of the detected humans of the current frame, the control circuit 102 may decrement the count.

Alternatively or in addition to, the control circuit 102 may transmit, at a conclusion of the plurality of frames, an alert message that indicates a value of the count, at step 824. For example, when the third frame 406 is the last frame of the captured video footage in the area, the control circuit 102 may determine that the total count may correspond to three (3) detected humans (e.g., human A, B, and C'). As such, at a particular time corresponding to the last frame, there are three (3) detected humans in the area of the retail facility 118. By one approach, the alert message may include a store identifier, a video camera identifier, and/or an area identifier. For example, the control circuit 102 may determine that there are three (3) detected humans at a checkout station of the retail facility and determine that based on the total count reaching a predefined count threshold associated with the checkout station, additional associate may be needed at the checkout station. For example, the transmitted alert message may include a message indicating a number of additional associates needed at the area. Thus, the control circuit 102 may assign a designated number of associates available at the area (e.g., at the checkout station for example) at a particular period of time based on the value of the count over a time period. By one approach, the area may include an exit area, a cafeteria, a checkout station, and/or a customer service area, among other areas in the retail facility 118. In some implementations, the alert message described herein may be received by the electronic device 114 coupled via the network 116. By one approach, the electronic device 114 may be worn by an associate at the retail facility 118. By another approach, the network 116 may include a wired network, a wireless network, an Internet, and/or a Wi-Fi network, among other types of communication network configured to couple one electronic device to other electronic devices.

Figure 5:
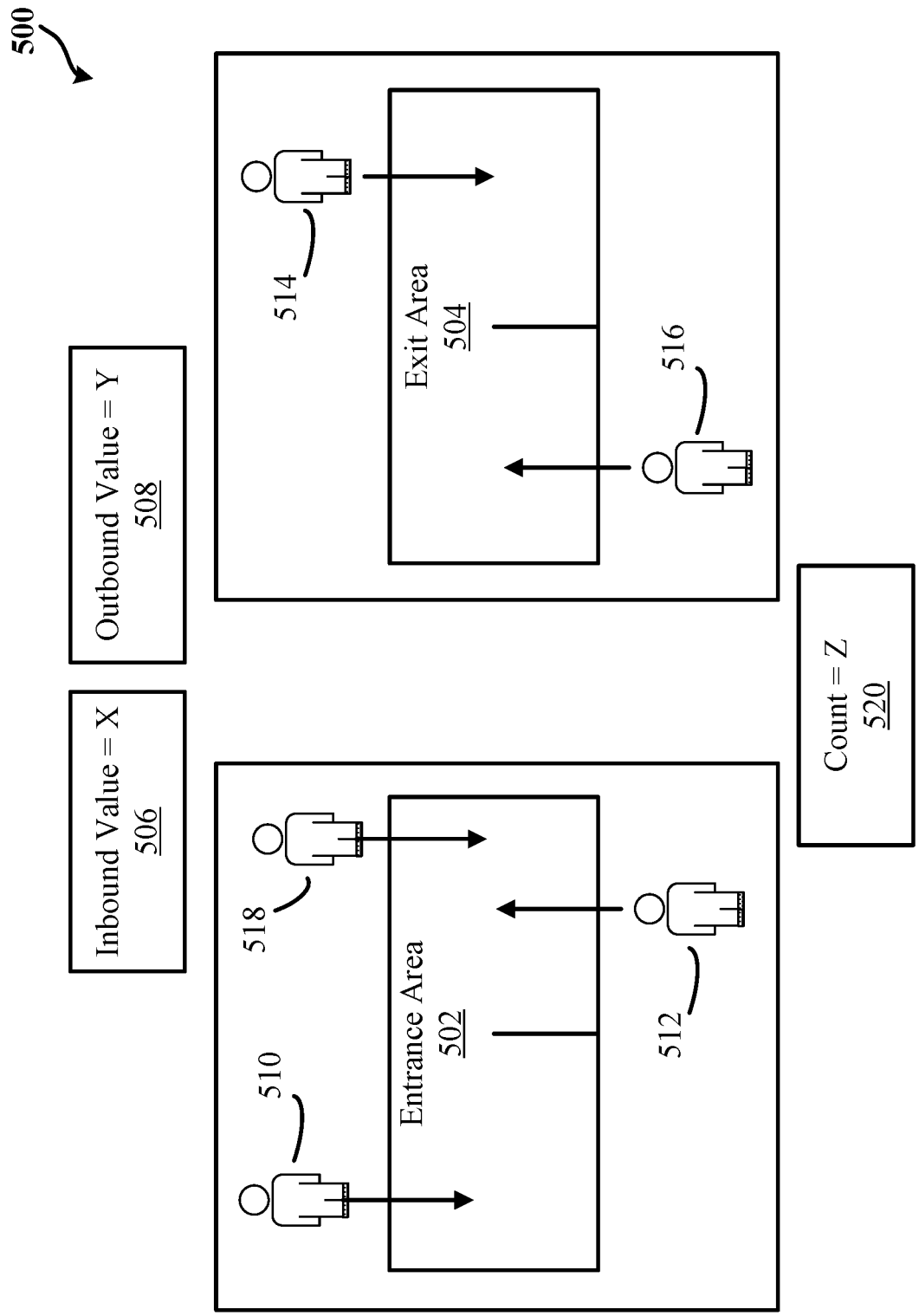
FIG. 5 illustrates a simplified schematic illustration of an exemplary detection and tracking at an entrance area and an exit area of a retail facility in accordance with some embodiments.

In some embodiments, based on detecting and tracking movement and/or the trajectory path 206 of the detected human over multiple frames spanning over a period of time, the control circuit 102 may determine a count of humans inside the retail facility 118 and/or count of humans at a particular area in the retail facility 118 at any particular time. For example, the control circuit 102 may determine a count of humans inside the retail facility 118 at a particular point in time and/or a particular period of time. By one approach, a period of time may include a period of time in a day, a day, a week, a month, and/or a year. To illustrate, FIG. 5 is described below with elements and/or components previously described in FIGS. 1, 2, and 4. FIG. 5 illustrates a simplified schematic illustration of an exemplary system 500 that detects and tracks humans at an entrance area 502 and an exit area 504 of the retail facility 118 in accordance with some embodiments. The system 500 includes the first video camera 120 and the second video camera 122. By one approach, the first video camera 120 may be mounted and arranged to capture a first video footage of the entrance area 502 of the retail facility 118 in real time, at step 902. In such an approach, the entrance area 502 is not intended to be an exit. In one scenario, the first video camera 120 may include a first low resolution camera capturing images at less than 800 pixels by 600 pixels. By another approach, the second video camera 122 may be mounted and arranged to capture a second video footage of the exit area 504 of the retail facility 118 in real time, at step 904. In such an approach, the exit area 504 is not intended to be an entrance. In one scenario, wherein the second video camera 122 may include a second low resolution camera capturing images at less than 800 pixels by 600 pixels. In one configuration, the control circuit 102 may detect, for each of a plurality of frames of the first and second video footages and using a human detection module (e.g., the detection module 106) including a neural network model, one or more humans and estimate locations of the one or more humans within at least one of a first region, a second region and a third region of the entrance area 502 and the exit area 504, at step 910. In one scenario, the neural network model may correspond to the neural network model previously described above. In another scenario, each of the first region, the second region and the third region of a frame capturing an image of the entrance area 502 and/or the exit area 504 may correspond to the first region 214, the second region 212, and the third region 210 described in FIG. 2. In some implementations, the control circuit 102 may track, over the plurality of frames of the video footages and using a human tracking module (e.g., the tracking module 104) according to the set of rules 110, a location of a detected human, and movement of the detected human relative to the first region 214, the second region 212, and the third region 210, at step 912.

For example, the control circuit 102 may determine that a first human 514 has entered the retail facility 118 through the exit area 504 based on a determination that the first human 514 has moved from the third region 210 to the second region 212 and to the first region 214 based on an evaluation of video footage received from the second video camera 122 using the detection and tracking described in FIG. 4. In another example, the control circuit 102 may determine that a second human 516 has exited the retail facility 118 through the exit area 504 based on a determination that the second human 516 has moved from the first region 214 to the second region 212 and to the third region 210 based on an evaluation of video footage received from the second video camera 122 using the detection and tracking described in FIG. 4.

In yet another example, the control circuit 102 may determine that a third human 510 and a fifth human 518 have entered the retail facility 118 through the entrance area 502 based on a determination that the third human 510 and the fifth human 518 have moved from the third region 210 to the second region 212 and to the first region 214 based on an evaluation of video footage received from the first video camera 120 using the detection and tracking described in FIG. 4. In another example, the control circuit 102 may determine that a fourth human 512 has exited the retail facility 118 through the entrance area 502 based on a determination that the fourth human 512 has moved from the first region 214 to the second region 212 and to the third region 210 based on an evaluation of video footage received from the first video camera 120 using the detection and tracking described in FIG. 4. By one approach, one or both the entrance area 502 and the exit area 504 may be unguarded and/or unmanned.

In some implementations, the control circuit 102 may define an inbound value 506 as a total number of detected and tracked humans entering the retail facility 118 at the entrance area 502 and the exit area 504. By one approach, the control circuit 102 may define an outbound value 508 as a total number of detected and tracked humans exiting the retail facility 118 at the entrance area 502 and the exit area 504. In one configuration, the control circuit 102 may define a count 520 as a total number of people inside the retail facility 118. In an illustrative non-limiting example, the control circuit 102 may increment the outbound value 508 in response to a determination that one or more detected humans have moved from the first region 214 to the second region 212 and to the third region 210, at step 914. Alternatively or in addition to, the control circuit 102 may increment the inbound value 506 in response to a determination that one or more detected humans have moved from the third region to the second region and to the first region, at step 916. Alternatively or in addition to, the control circuit 102 may subtract the outbound value 508 from the inbound value 506 to determine the count 520 of people inside the retail facility 118, at step 918.

To illustrate, at a particular point in time, FIG. 5 shows the fourth human 512 and the second human 516 leaving the retail facility 118 through the entrance area 502 and the exit area 504, respectively. In such an example, the control circuit 102 may determine that the outbound value 508 may correspond to a value of 2. FIG. 5 also shows the third human 510 and the fifth human 518 along with the first human 514 entering the retail facility 118 through the entrance area 502 and the exit area 504, respectively. In such an example, the control circuit 102 may determine that the inbound value 506 may correspond to a value of 3. As such, the control circuit 102 may determine that there are 1 human inside the retail facility 118 at the particular point in time.

Figure 6:
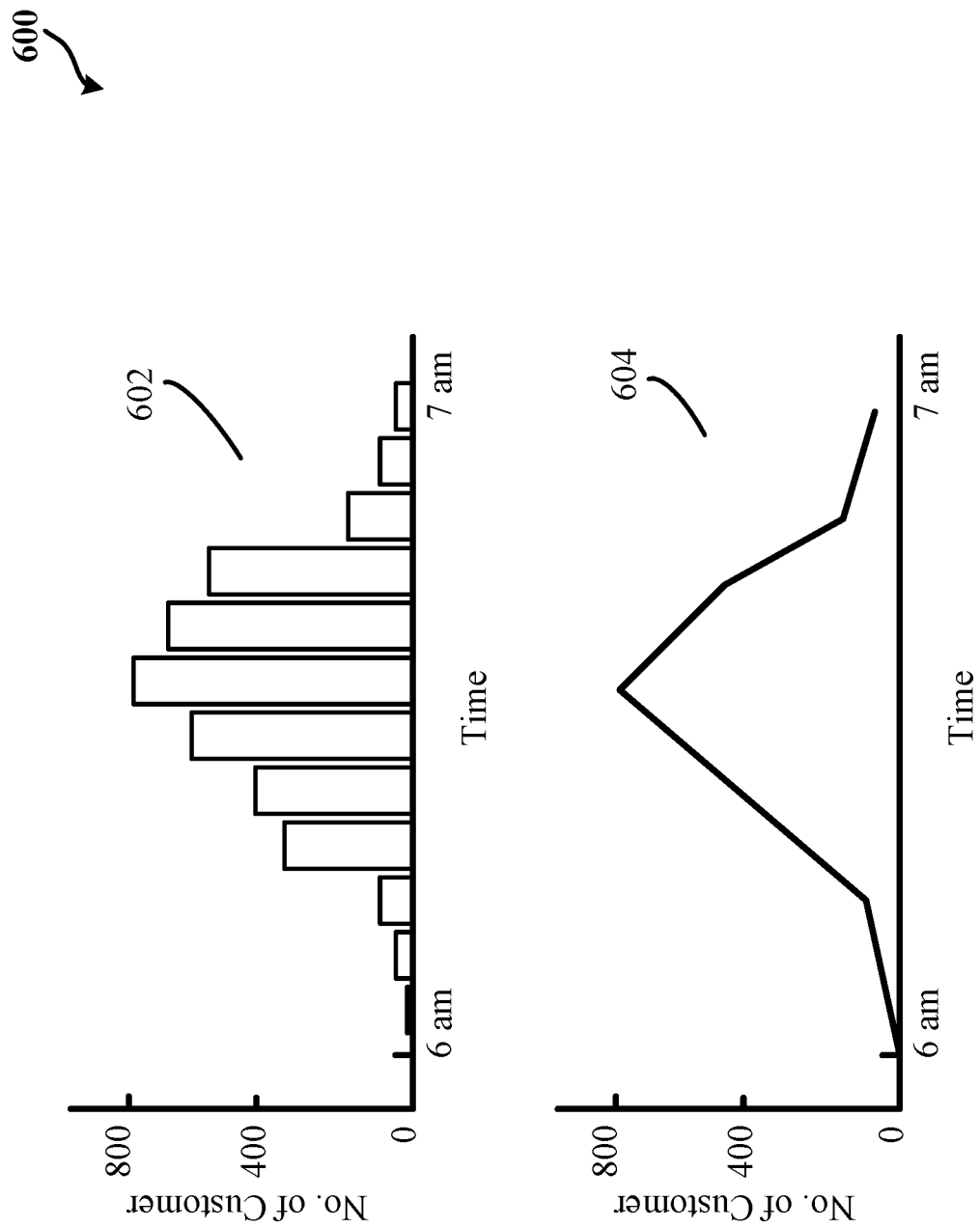
FIG. 6 illustrates exemplary diagrams illustrating a count of people at a retail facility in accordance with some embodiments.
Figure 7:
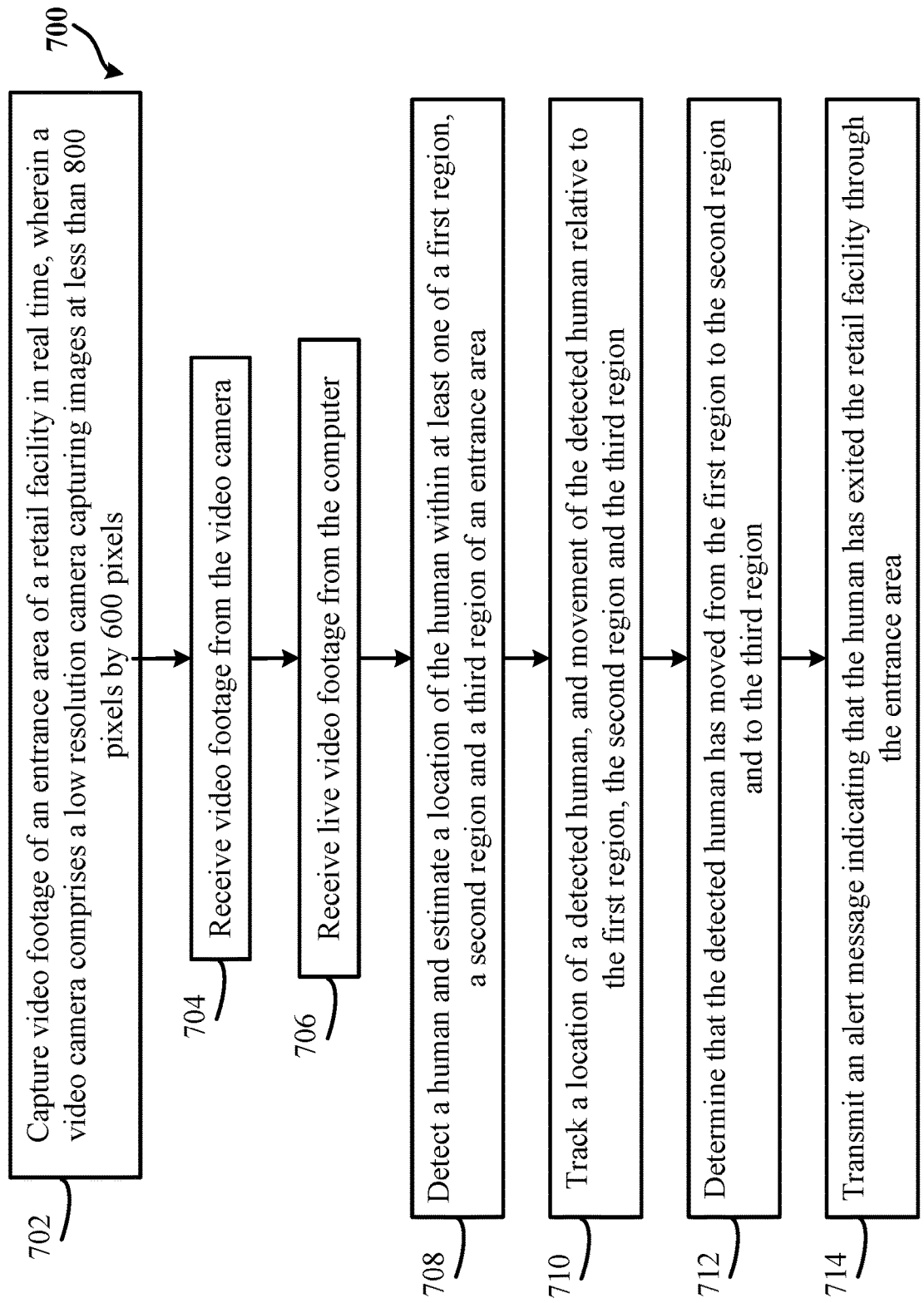
FIG. 7 shows a flow diagram of an exemplary process of detecting egress at an entrance area of a retail facility in accordance with some embodiments.
Figure 8A:
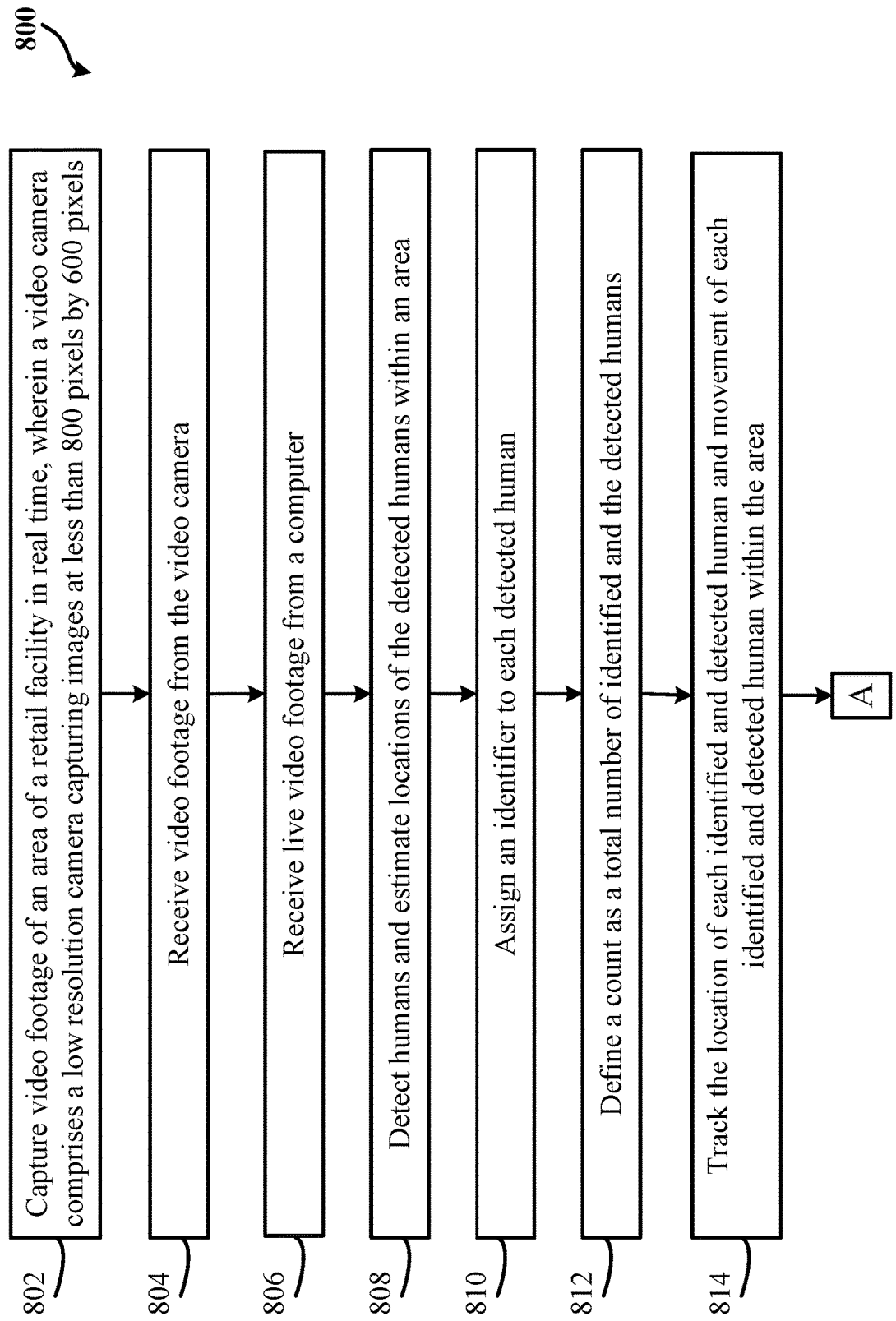
FIGS. 8A and 8B shows a flow diagram of an exemplary process of counting humans at an area of a retail facility over a period of time in accordance with some embodiments.
Figure 8B:
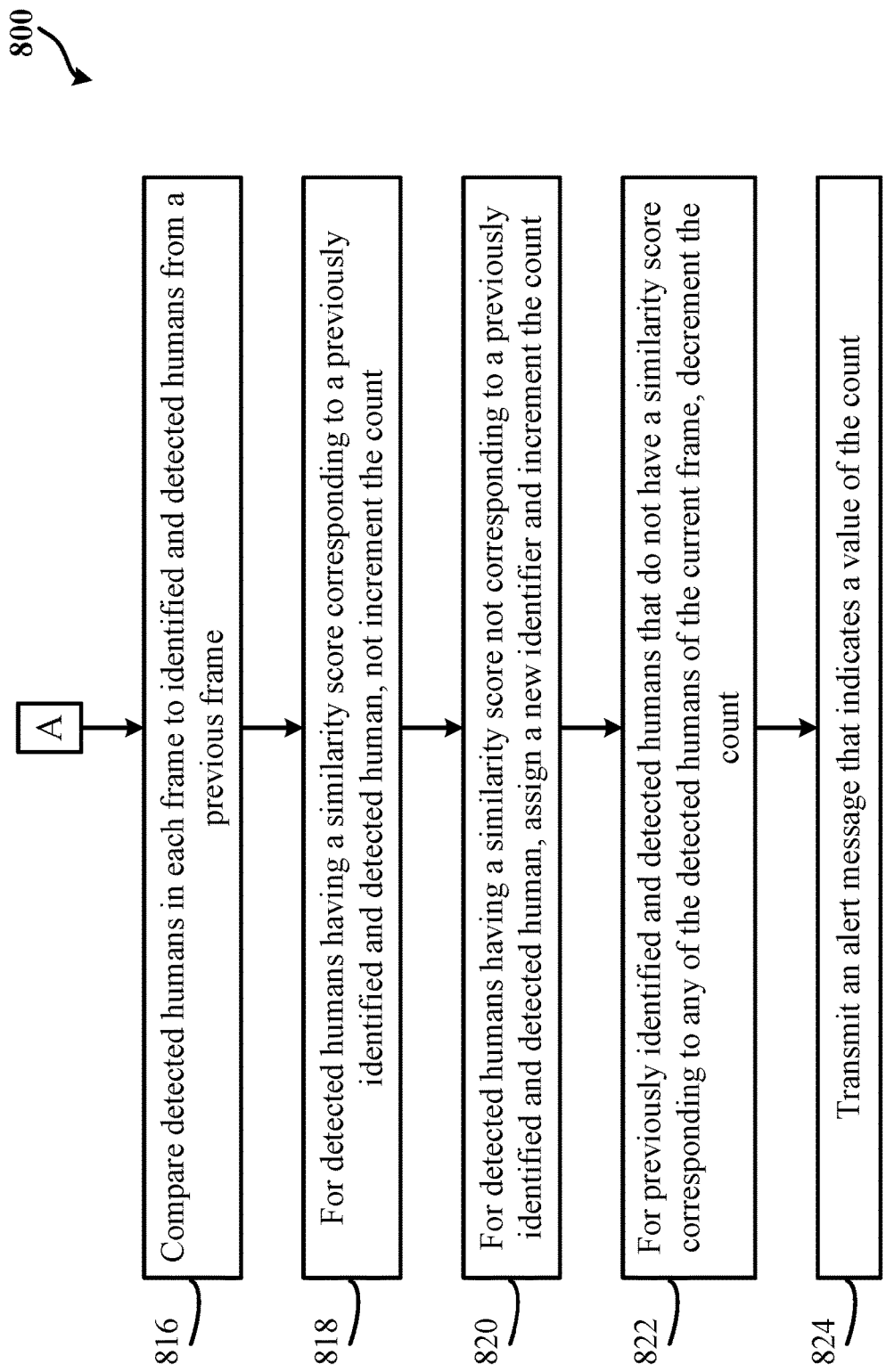
Figure 9A:
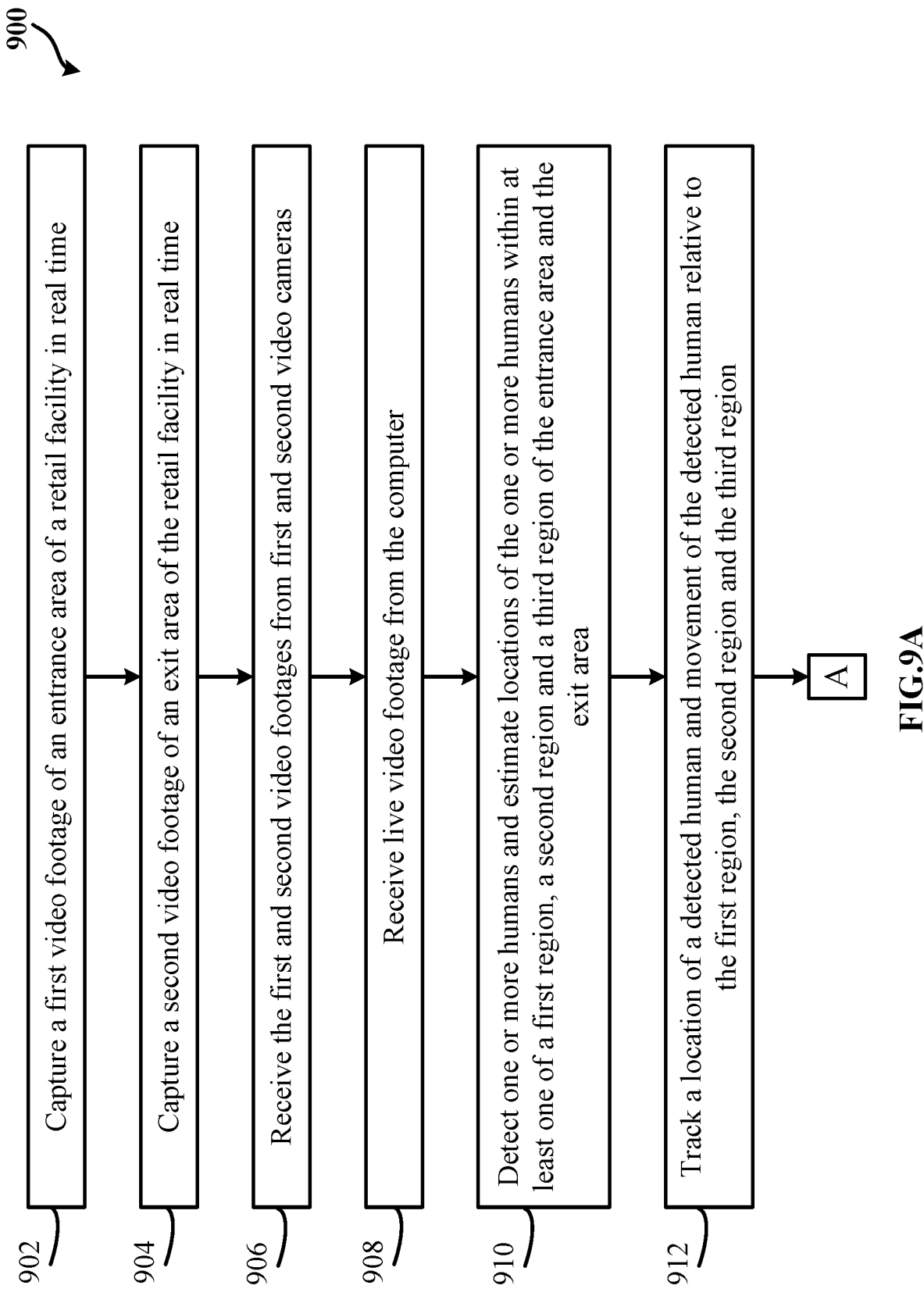
FIGS. 9A and 9B shows a flow diagram of an exemplary process of determining a count of people at a retail facility in accordance with some embodiments.
Figure 9B:
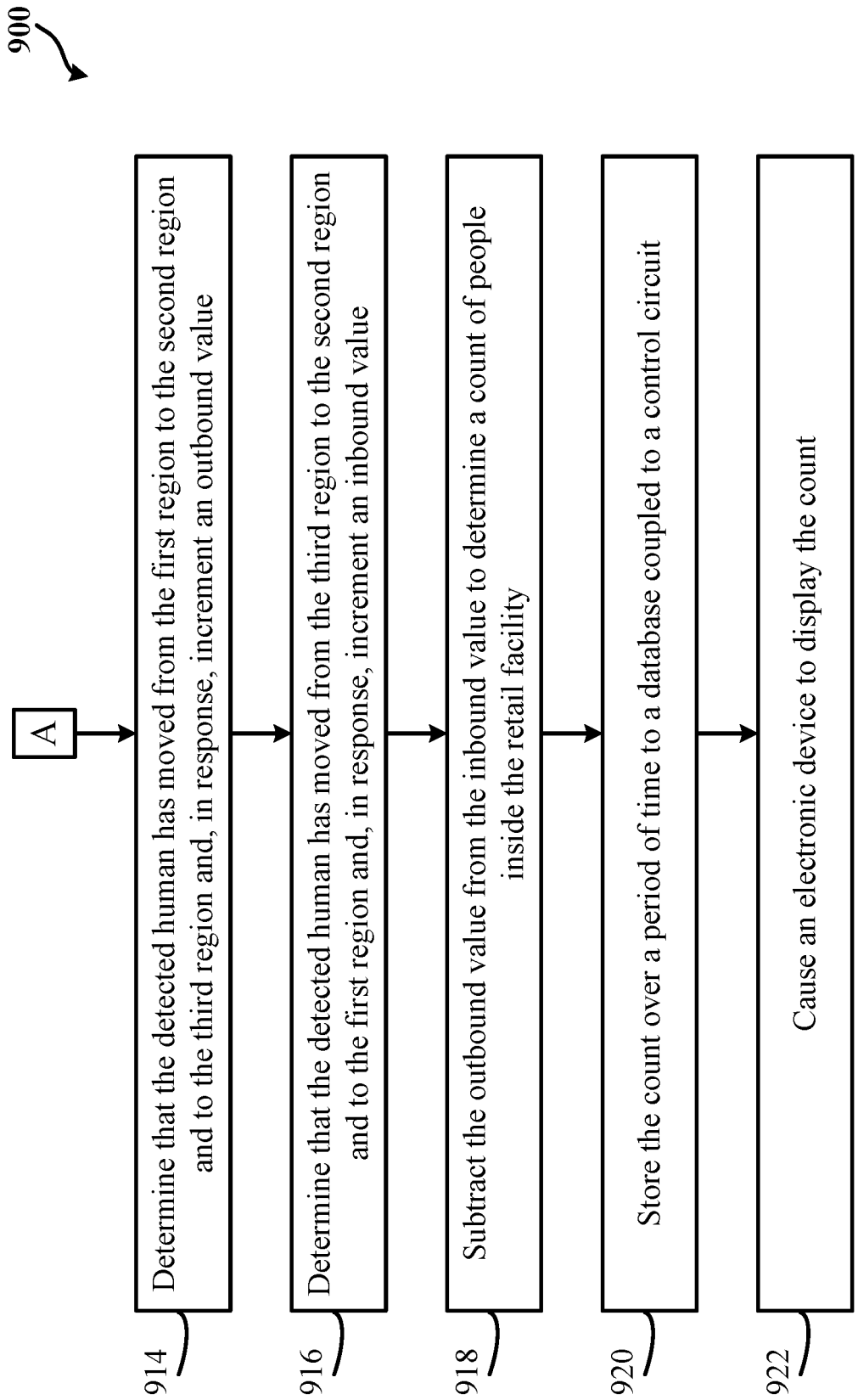

In some implementations, the control circuit 102 may store the count 520 over a period of time to a database coupled to the control circuit 102, at step 920. By one approach, the memory 108 may include the database. In one scenario, the control circuit 102 may cause the electronic device 114 to display the count 520 periodically and/or when triggered at a particular time, at step 922. In one example, the electronic device 114 may include portable electronic devices (e.g., a smartphone, a smartwatch, a laptop, a tablet, among other types of electronic devices capable of being easily carried and/or moved from one place to another). In another example, the electronic device 114 may include a display device configured to be seen by a plurality of humans at the same time (e.g., a tv display, a monitor, and/or the like). In one configuration, the system 500 may include the electronic device 114 that may display the count 520 over a period of time. For example, FIG. 6 illustrates exemplary diagrams 600 illustrating a count of humans at a retail facility in accordance with some embodiments. In one example, the electronic device 114 may display a bar graph 602 showing the count 520 over a 24 hour period. In another example, the electronic device 114 may display a line graph 604 showing the count 520 over another 24 hour period. In yet another example, the electronic device 114 may display the count 520 by displaying the count 520 periodically, among other ways to display or shown the count 520. In some implementations, the control circuit 102 may determine a number of purchase transactions at the retail facility 118 over a period of time and/or determine a conversion rate at the retail facility 118 based on the number of purchase transactions and the count of people inside the retail facility 118. For example, the conversion rate indicates a measurement of a proportion of visitors to the retail facility 118 who make a purchase. As such, by performing both tracking and detection of humans on every frame, the control circuit 102 may determine an accurate conversion rate since misdetection and/or mis-tracking are substantially and/or significantly reduced as compared to those of the conventional systems.

In another illustrative non-limiting example, the frame 200 is shown in FIG. 2. The frame 200 includes the human 204 detected by the detection module 106 in cooperation with the control circuit 102. By one approach, the tracking module 104 may determine the trajectory path 206 of the detected human 204. As shown, the human 204 may be first detected in the first region 214, then in second region 212, and then in the third region 210 as shown in FIG. 2. The trajectory path 206 may then be the first region 214 to the second region 212 to the third region 210. To aid in a determination of the trajectory path 206, the control circuit 102 may use preset thresholds (e.g., the preset horizontal thresholds 208, 216) to quantitatively define the set of rules 110 defining events like "people walking into the store", "people walking out of the store", etc. To illustrate, to trigger an alert indicating that a human is walking out of the store through the entrance area, the human may start its trajectory below a first preset threshold 216 and end its trajectory passed a second preset threshold 208. Alternatively or in addition to, the control circuit 102 may keep track of the trajectory path 206 taken by the detected human 204 based on a determination of whether a center of the bounding box 202 corresponding to the detected human 204 has an x,y coordinate that started below the first preset threshold 216 or the second preset threshold 208 and ended above the first preset threshold 216 or the second preset threshold 208. In one scenario, the tracking database 112 may include x,y coordinates of centers of stored bounding boxes to enable the control circuit 102 to determine trajectory path of each stored bounding box.

In one configuration, the set of rules 110 may include at least two sets of the at least two preset horizontal thresholds 208, 216. By one approach, the control circuit 102 may use a first set of the at least two sets based on determining whether the trajectory path 206 of the detected human 204 is inbound. In another example, the control circuit 102 may use a second set of the at least two sets based on determining whether the trajectory path 206 of the detected human 204 is outbound. For example, the first preset horizontal threshold 216 of the first set (inbound) may be determined by the control circuit 102 based on adding 0.65 to a y-coordinate of a center of the bounding box 202 while the second preset horizontal threshold 208 of the first set (inbound) may be determined based on subtracting 0.7 from a lower limit of the bounding box 202 (e.g., one of y-coordinates of the two bottom corners of the bounding box 202 or a y-coordinate that is the lowest value among the y-coordinates of the two bottom corners of the bounding box 202).

In yet another example, the first preset horizontal threshold 216 of the second set (outbound) may be determined by the control circuit 102 based on subtracting 0.4 to a y-coordinate of a center of the bounding box 202 while the second preset horizontal threshold 208 of the second set (outbound) may be determined based on adding 0.45 from a lower limit of the bounding box 202 (e.g., one of y-coordinates of the two bottom corners of the bounding box 202 or a y-coordinate that is the lowest value among the y-coordinates of the two bottom corners of the bounding box 202). In such examples, the two sets of the at least two preset horizontal thresholds 208, 216 described above may be used as initial parameters used by the control circuit 102 to detect and track humans in each frame. By one approach, each retail facility may adjust the initial parameters based on the video camera and/or the area where the video footage is captured from. Alternatively or in addition to, when the control circuit 102 determines that a height of the bounding box 202 is less than 0.15, the control circuit 102 may not cause the tracking database 112 to store the bounding box 202 and determine that a misdetection has occurred.

Figure 3:
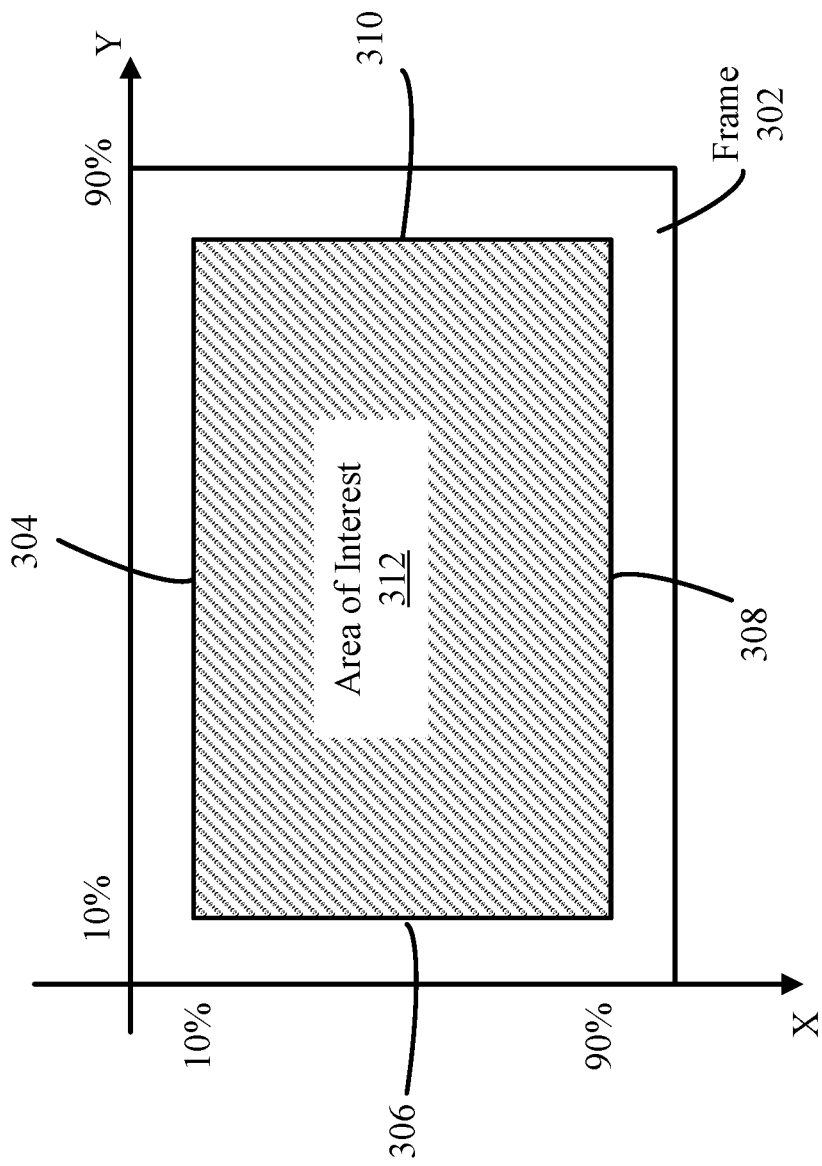
FIG. 3 is a simplified illustration of exemplary boundaries in a frame of a video footage in accordance with some embodiments.

In another illustrative non-limiting example, FIG. 3 is a simplified illustration of exemplary boundaries in a frame 302 of a video footage in accordance with some embodiments. By one approach, the control circuit 102 may evaluate the frame 302 based at least in part on one or more preset and/or predefined boundaries. In some configuration, the one or more preset boundaries may form a perimeter boundary relative to the frame 302. In one example, inside the perimeter may form an area of interest 312. By one approach, the control circuit 102 may detect and/or track humans that are substantially within the area of interest 312 based on whether a center of a bounding box corresponding to a detected human has an x,y coordinates that are located inside the area of interest 312. By one approach, the set of rules 110 may include a plurality of preset boundaries forming a perimeter on a frame. In such an approach, a detected human having an estimated location (e.g., x,y coordinates of a center of a bounding box corresponding to the detected human) that falls outside the perimeter is not considered in the count 520, for example.

In some implementations, the perimeter boundary of the frame 302 may have four preset boundaries including a first horizontal boundary 304, a second horizontal boundary 308, a first vertical boundary 306, and a second vertical boundary 310. For example, the control circuit 102 may determine that a detected person is out of a field of view (FOV) of one of the video cameras 120, 122, 124 by determining that a center of a bounding box corresponding to a detected human has an x-coordinate that correspond to an x value that is less than 10% relative to an x-axis of the frame 302. In another example, the control circuit 102 may determine that the detected human is out of the FOV of one of the video cameras 120, 122, 124 by determining that the center of the bounding box have an x-coordinate that correspond to an x value that is greater than 90% relative to the x-axis of the frame 302. In another example, the control circuit 102 may determine that the detected person is out of the FOV of one of the video cameras 120, 122, 124 by determining that the center of the bounding box have a y-coordinate that correspond to a y value that is less than 10% relative to a y-axis of the frame 302. In yet another example, the control circuit 102 may determine that the detected person is out of the FOV of one of the video cameras 120, 122, 124 by determining that the center of the bounding box have a y-coordinate that correspond to a y value that is greater than 90% relative to the y-axis of the frame 302. In some implementations, the one or more preset boundaries may be set for each video camera. In some embodiments, the tracking database 112 may include one or more tracking list storing x,y coordinates of a center point for each bounding box stored in the tracking database 112. By one approach, each of the one or more tracking list may be associated with a particular video camera. In yet another implementation, the control circuit 102 may detect and/or track one or more humans and/or one or more shopping carts. As such, a detection and/or a tracking of a human as described herein may also be applicable to a detection and/or a tracking of a shopping cart.

In an illustrative non-limiting example, the first video camera 120, the second video camera 122, and/or the third video camera 124 may capture 30 frames every second. By one approach, the captured video footage and/or video stream may be provided to the control circuit 102 (e.g., a central computer, a main server, a distributive computing system, and/or the like). In one configuration, the control circuit 102 may process and/or evaluate each frame every second. In another configuration, the control circuit may process and/or evaluate each frame at a frequency predetermined by an associate. In some implementations, the control circuit 102 may maintain a listing of people in a FOV of a video camera (e.g. the first video camera 120, the second video camera 122, and/or the third video camera 124). In some implementations, the control circuit 102 may utilize a fusion method of object and/or human detection and tracking where both tracking and detection are performed on each frame of a video footage. For example, the detection module 106 and the tracking module 104 may cooperatively work and/or collaborate with one another to achieve a robust human counting by, for example, ensuring that when the detection module 106 fails to detect in a subsequent frame a previously detected human, the tracking module 104 may maintain tracking of the previously detected human in the same subsequent frame. As such, in this example, a misdetection is avoided. In another example, when the tracking module 104 fails to track in a subsequent frame a previously detected human, the detection module 106 may detect the previously detected human in the same subsequent frame. As such, in this example, a mis-tracking is avoided.

In such examples, the control circuit 102 may determine an accurate number of humans in an area and/or perform an accurate count of human at a particular period of time. To illustrate, for example, at a particular period of time, the tracking database 112 may store and/or maintain a listing of people in a FOV of a video camera 120, 122, 124 with their corresponding bounding boxes. By one approach, every 0.5 second, the control circuit 102 may process and/or evaluate (e.g., detect and track) a frame, search new locations of original and/or previous bounding boxes based on the correlations and/or determination of IoUs between original and/or previous bounding boxes with new bounding boxes as described above, and/or count humans in an area. In one configuration, the number of humans in the list may be considered to be the count of people in the area covered by the video camera. As such, based on the cooperative function and/or collaboration between the detection module 106 and the tracking module 104 as described herein, a likelihood of misdetection and/or mis-tracking is significantly reduced resulting in an accurate counting of humans at an area at a particular time.

Further, the circuits, circuitry, systems, devices, processes, methods, techniques, functionality, services, servers, sources and the like described herein may be utilized, implemented and/or run on many different types of devices and/or systems. FIG. 10 illustrates an exemplary system 1000 that may be used for implementing any of the components, circuits, circuitry, systems, functionality, apparatuses, processes, or devices of the system 100 of FIG. 1, the system 500 of FIG. 5, the method 700 of FIG. 7, the method 800 of FIG. 8, the method 900 of FIG. 9, and/or other above or below mentioned systems or devices, or parts of such circuits, circuitry, functionality, systems, apparatuses, processes, or devices. For example, the system 1000 may be used to implement some or all of the system for detecting egress at an entrance area of a retail facility, counting humans at an area of a retail facility over a period of time, determining a count of people at a retail facility, the control circuit 102, the tracking module 104, the detection module 106, the memory 108, the tracking database 112, the electronic device 114, the computer 126, the first video camera 120, the second video camera 122, the third video camera 124, and/or other such components, circuitry, functionality and/or devices. However, the use of the system 1000 or any portion thereof is certainly not required.

By way of example, the system 1000 may comprise a processor module (or a control circuit) 1012, memory 1014, and one or more communication links, paths, buses or the like 1018. Some embodiments may include one or more user interfaces 1016, and/or one or more internal and/or external power sources or supplies 1040. The control circuit 1012 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1012 can be part of control circuitry and/or a control system 1010, which may be implemented through one or more processors with access to one or more memory 1014 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1000 may be used to implement one or more of the above or below, or parts of, components, circuits, systems, processes and the like. For example, the system 1000 may implement the system for detecting egress at an entrance area of a retail facility, counting humans at an area of a retail facility over a period of time, and determining a count of people at a retail facility with the control circuit 102, the tracking module 104, and/or the detection module 106 being the control circuit 1012.

The user interface 1016 can allow a user to interact with the system 1000 and receive information through the system. In some instances, the user interface 1016 includes a display 1022 and/or one or more user inputs 1024, such as buttons, touch screen, track ball, keyboard, mouse, etc., which can be part of or wired or wirelessly coupled with the system 1000. Typically, the system 1000 further includes one or more communication interfaces, ports, transceivers 1020 and the like allowing the system 1000 to communicate over a communication bus, a distributed computer and/or communication network (e.g., a local area network (LAN), the Internet, wide area network (WAN), etc.), communication link 1018, other networks or communication channels with other devices and/or other such communications or combination of two or more of such communication methods. Further the transceiver 1020 can be configured for wired, wireless, optical, fiber optical cable, satellite, or other such communication configurations or combinations of two or more of such communications. Some embodiments include one or more input/output (I/O) interface 1034 that allow one or more devices to couple with the system 1000. The I/O interface can be substantially any relevant port or combinations of ports, such as but not limited to USB, Ethernet, or other such ports. The I/O interface 1034 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1026 to provide information to the system and/or sensor information that is communicated to another component, such as the control circuit 102, the tracking module 104, the detection module 106, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1000 comprises an example of a control and/or processor-based system with the control circuit 1012. Again, the control circuit 1012 can be implemented through one or more processors, controllers, central processing units, logic, software and the like. Further, in some implementations the control circuit 1012 may provide multiprocessor functionality.

The memory 1014, which can be accessed by the control circuit 1012, typically includes one or more processor readable and/or computer readable media accessed by at least the control circuit 1012, and can include volatile and/or non-volatile media, such as RAM, ROM, EEPROM, flash memory and/or other memory technology. Further, the memory 1014 is shown as internal to the control system 1010; however, the memory 1014 can be internal, external or a combination of internal and external memory. Similarly, some or all of the memory 1014 can be internal, external or a combination of internal and external memory of the control circuit 1012. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1014 can store code, software, executables, scripts, data, content, lists, programming, programs, log or history data, user information, customer information, product information, and the like. While FIG. 10 illustrates the various components being coupled together via a bus, it is understood that the various components may actually be coupled to the control circuit and/or one or more other components directly.

Embodiments of systems and methods are provided relating to one or more of detecting egress at an entrance of a retail facility, counting humans at an area of a retail facility over a period of time, and determining a count of people at a retail facility.

In some embodiments, a system for use in detecting egress at an entrance of a retail facility comprises: a video camera mounted and arranged to capture video footage of an entrance area of a retail facility in real time, wherein the entrance area is not intended to be an exit, wherein the video camera comprises a low resolution camera capturing images at less than 800 pixels by 600 pixels: a computer at the retail facility and coupled to the video camera and configured to receive the video footage from the video camera; a network coupled to the computer; and a control circuit coupled to the network, wherein the control circuit is at a central location remote from the retail facility and is configured to receive the live video footage from the computer via the network. The control circuit is configured to: detect, for each of a plurality of frames of the video footage and using a human detection module comprising a neural network model, a human and estimate a location of the human within at least one of a first region, a second region and a third region of the entrance area, wherein the first region corresponds to a region inside of a doorway of the entrance area, wherein the second region corresponds to a region proximate the doorway, and wherein the third region corresponds to a region outside of the doorway and further out the doorway than the second region, and wherein the neural network model is trained using stored footage from one of the video camera and a similar video camera having similar resolution and point of view; track, over the plurality of frames of the video footage and using a human tracking module according to a set of rules, a location of a detected human, and movement of the detected human relative to the first region, the second region and the third region; determine that the detected human has moved from the first region to the second region and to the third region; and transmit an alert message that indicates that the human has exited the retail facility through the entrance area, wherein the alert message further comprises a camera identifier, a store identifier and an image capture of the detected human.

In some embodiments, the at least one of the first region, the second region and the third region of the entrance area are formed from at least two preset horizontal thresholds applied across each of the plurality of frames, wherein the set of rules comprises the at least two preset horizontal thresholds determined based on the video camera and the entrance area. In some embodiments, the entrance area comprises an unguarded entrance. In some embodiments, the system further comprises a tracking database coupled to the control circuit and configured to store a plurality of identifiers each associated with one of detected human and tracked human on each current frame that is currently being processed by the control circuit for each of a plurality of retail facilities. In some embodiments, the control circuit is further configured to: store the alert message over a period of time; determine a total count of alert messages over the period of time; determine whether the total count has reached a threshold value; and in response to the total count reaching the threshold value, provide a notification message to an electronic device indicating an assignment of an associate at the entrance area. In some embodiments, the control circuit is further configured to: store occurrences of the alert message over a period of time; determine occurrences of shrinkage at the retail facility over the period of time; and correlate the occurrences of the alert message with the occurrences of shrinkage over the period of time. In some embodiments, the system further comprises an electronic device configured to receive the alert message, wherein the electronic device is worn by an associate at the retail facility. In some embodiments, the alert message further comprises a timestamp corresponding to a time the human exited the retail facility through the entrance area.

In some embodiments, a method for use in counting humans at an area of a retail facility over a period of time comprises: capturing, by a video camera mounted and arranged to capture, video footage of an entrance area of a retail facility in real time, wherein the video camera comprises a low resolution camera capturing images at less than 800 pixels by 600 pixels; receiving, by a computer at the retail facility and coupled to the video camera via a network, video footage from the video camera; receiving, by a control circuit coupled to the network and at a central location remote from the retail facility, the live video footage from the computer; detecting a human and estimating, by the control circuit for each of a plurality of frames of the video footage and using a human detection module comprising a neural network model, a location of the human within at least one of a first region, a second region and a third region of the entrance area, wherein the first region corresponds to a region inside of a doorway of the entrance area, wherein the second region corresponds to a region proximate the doorway, and wherein the third region corresponds to a region outside of the doorway and further out the doorway than the second region, and wherein the neural network model is trained using stored footage from one of the video camera and a similar video camera having similar resolution and point of view; tracking, by the control circuit, over the plurality of frames of the video footage and using a human tracking module according to a set of rules, a location of a detected human, and movement of the detected human relative to the first region, the second region and the third region; determining, by the control circuit, that the detected human has moved from the first region to the second region and to the third region; and transmitting, by the control circuit, an alert message that indicates that the human has exited the retail facility through the entrance area, wherein the alert message further comprises a camera identifier, a store identifier and an image capture of the detected human.

In some embodiments, the at least one of the first region, the second region and the third region of the entrance area are formed from at least two preset horizontal thresholds applied across each of the plurality of frames, wherein the set of rules comprises the at least two preset horizontal thresholds determined based on the video camera and the entrance area. In some embodiments, the entrance area comprises an unguarded entrance. In some embodiments, the method further comprises storing, by a tracking database coupled to the control circuit, a plurality of identifiers each associated with one of detected human and tracked human on each current frame that is currently being processed by the control circuit for each of a plurality of retail facility. In some embodiments, the method further comprises: storing, by the control circuit, the alert message over a period of time; determining, by the control circuit, a total count of alert messages over the period of time; determining, by the control circuit, whether the total count has reached a threshold value; and in response to the total count reaching the threshold value, providing, by the control circuit, a notification message to an electronic device indicating an assignment of an associate at the entrance area. In some embodiments, the method further comprises: storing, by the control circuit, occurrences of the alert message over a period of time; determining, by the control circuit, occurrences of shrinkage at the retail facility over the period of time; and correlating, by the control circuit, the occurrences of the alert message with the occurrences of shrinkage over the period of time. In some embodiments, the method further comprises receiving, by an electronic device coupled to the network, the alert message, wherein the electronic device is worn by an associate at the retail facility. In some embodiments, the alert message further comprises a timestamp corresponding to a time the human exited the retail facility through the entrance area.

In some embodiments, a system for use in counting humans at an area of a retail facility over a period of time comprises: a video camera mounted and arranged to capture video footage of an area of a retail facility in real time, wherein the video camera comprises a low resolution camera capturing images at less than 800 pixels by 600 pixels; a computer at the retail facility and coupled to the video camera and configured to receive the video footage from the video camera; a network coupled to the computer; and a control circuit coupled to the network. The control circuit is at a central location remote from the retail facility and is configured to receive the live video footage from the computer via the network, wherein the control circuit is configured to: detect, for each of a plurality of frames of the video footage and using a human detection module comprising a neural network model, humans and estimate locations of the detected humans within the area, wherein the neural network model is trained using a database of stored footage from one of the video camera and a similar video camera having similar resolution and point of view; assign an identifier to each detected human; define a count as a total number of identified and the detected humans; track, over the plurality of frames of the video footage spanning the period of time and using a human tracking module according to a set of rules, the location of each identified and detected human and movement of each identified and detected human within the area. The control circuit is configured to track by: comparing detected humans in each frame to identified and detected humans from a previous frame; for detected humans having a similarity score corresponding to a previously identified and detected human, not incrementing the count; for detected humans having a similarity score not corresponding to a previously identified and detected human, assigning a new identifier and incrementing the count; and for previously identified and detected humans that do not have a similarity score corresponding to any of the detected humans of a current frame, decrement the count; and transmit, at a conclusion of the plurality of frames, an alert message that indicates a value of the count, wherein the alert message further comprises a store identifier, a camera identifier, and an area identifier.

In some embodiments, the set of rules includes a plurality of preset boundaries forming a perimeter on a frame. In some embodiments, the detected human having an estimated location that falls outside the perimeter is not considered in the count. In some embodiments, the area includes an exit area, a cafeteria, a checkout station, and/or a customer service area. In some embodiments, the system includes a tracking database coupled to the control circuit. In some embodiments, the tracking database stores a plurality of identifiers each associated with one of detected human and tracked human on each current frame that is currently being processed by the control circuit for each of a plurality of retail facility. In some embodiments, the control circuit assigns a designated number of associates available at the area at a particular period of time based on the value of the count. In some embodiments, the system includes an electronic device. In some embodiments, the electronic device receives the alert message. In some embodiments, the electronic device is worn by an associate at the retail facility.

In some embodiments, a method for use in counting humans at an area of a retail facility over a period of time comprises: capturing, by a video camera mounted and arranged to capture, video footage of an area of a retail facility in real time, wherein the video camera comprises a low resolution camera capturing images at less than 800 pixels by 600 pixels; receiving, by a computer at the retail facility and coupled to the video camera via a network, the video footage from the video camera; receiving, by a control circuit coupled to the network and at a central location remote from the retail facility, the live video footage from the computer; detecting, by the control circuit, for each of a plurality of frames of the video footage and using a human detection module comprising a neural network model, humans and estimating locations of the detected humans within the area, wherein the neural network model is trained using a database of stored footage from one of the video camera and a similar video camera having similar resolution and point of view; assigning, by the control circuit, an identifier to each detected human; defining, by the control circuit, a count as a total number of identified and the detected humans; tracking, by the control circuit, over the plurality of frames of the video footage spanning the period of time and using a human tracking module according to a set of rules, the location of each identified and detected human and movement of each identified and detected human within the area, wherein the control circuit is configured to track by: comparing detected humans in each frame to identified and detected humans from a previous frame; for detected humans having a similarity score corresponding to a previously identified and detected human, not incrementing the count; for detected humans having a similarity score not corresponding to a previously identified and detected human, assigning a new identifier and incrementing the count; and for previously identified and detected humans that do not have a similarity score corresponding to any of the detected humans of the current frame, decrementing the count; and transmitting, by the control circuit, at a conclusion of the plurality of frames, an alert message that indicates a value of the count, wherein the alert message further comprises a store identifier, a camera identifier, and an area identifier.

In some embodiments, the set of rules includes a plurality of preset boundaries forming a perimeter on a frame. In some embodiments, the detected human having an estimated location that falls outside the perimeter is not considered in the count. In some embodiments, the area includes an exit area, a cafeteria, a checkout station, and/or a customer service area. In some embodiments, the method includes storing, by a tracking database coupled to the control circuit, a plurality of identifiers each associated with one of detected human and tracked human on each current frame that is currently being processed by the control circuit for each of a plurality of retail facility. In some embodiments, the method includes assigning, by the control circuit, a designated number of associates available at the area at a particular period of time based on the value of the count. In some embodiments, the method includes receiving, by an electronic device coupled to the network, the alert message. In some embodiments, the electronic device is worn by an associate at the retail facility.

In some embodiments, a system for use in determining a count of people at a retail facility comprises: a first video camera mounted and arranged to capture a first video footage of an entrance area of a retail facility in real time, wherein the entrance area is not intended to be an exit, wherein the first video camera comprises a first low resolution camera capturing images at less than 800 pixels by 600 pixels; a second video camera mounted and arranged to capture a second video footage of an exit area of the retail facility in real time, wherein the exit area is not intended to be an entrance, wherein the second video camera comprises a second low resolution camera capturing images at less than 800 pixels by 600 pixels; a computer at the retail facility and coupled to the first and second video cameras and configured to receive the first and second video footages from the first and second video cameras; a network coupled to the computer; and a control circuit coupled to the network. The control circuit is at a central location remote from the retail facility and is configured to receive the live video footage from the computer via the network, wherein the control circuit is configured to: detect, for each of a plurality of frames of the first and second video footages and using a human detection module comprising a neural network model, one or more humans and estimate locations of the one or more humans within at least one of a first region, a second region and a third region of the entrance area and the exit area, wherein the first region corresponds to a region inside of a corresponding doorway of the entrance area and the exit area, wherein the second region corresponds to a region proximate the corresponding doorway, and wherein the third region corresponds to a region outside of the corresponding doorway and further out the corresponding doorway than the second region, and wherein the neural network model is trained using stored footage from one of the first video camera, the second video camera, and a similar video camera having similar resolution and point of view; track, over the plurality of frames of the first and second video footages and using a human tracking module according to a set of rules, a location of a detected human, and movement of the detected human relative to the first region, the second region and the third region; determine that the detected human has moved from the first region to the second region and to the third region and, in response, increment an outbound value; determine that the detected human has moved from the third region to the second region and to the first region and, in response, increment an inbound value; subtract the outbound value from the inbound value to determine a count of people inside the retail facility; store the count over a period of time to a database coupled to the control circuit; and cause an electronic device to display the count.

In some embodiments, the entrance area includes an unguarded entrance. In some embodiments, the system includes a tracking database coupled to the control circuit. In some embodiments, the tracking database stores a plurality of identifiers each associated with one of detected human and tracked human on each current frame that is currently being processed by the control circuit for each of a plurality of retail facility. In some embodiments, the control circuit determines a number of purchase transactions at the retail facility over the period of time. In some embodiments, the control circuit determines a conversion rate at the retail facility based on the number of purchase transactions and the count of people inside the retail facility. In some embodiments, the conversion rate indicates a measurement of a proportion of visitors to the retail facility who make a purchase. In some embodiments, the system includes the electronic device. In some embodiments, the electronic device displays the count over the period of time.

In some embodiments, a method for use in determining a count of people at a retail facility comprises: capturing, by a first video camera mounted and arranged to capture, a first video footage of an entrance area of a retail facility in real time, wherein the entrance area is not intended to be an exit, wherein the first video camera comprises a first low resolution camera capturing images at less than 800 pixels by 600 pixels; capturing, by a second video camera mounted and arranged to capture, a second video footage of an exit area of the retail facility in real time, wherein the exit area is not intended to be an entrance, wherein the second video camera comprises a second low resolution camera capturing images at less than 800 pixels by 600 pixels; receiving, by a computer at the retail facility and coupled to the first and second video cameras via a network, the first and second video footages from the first and second video cameras; receiving, by a control circuit coupled to the network and at a central location remote from the retail facility, the live video footage from the computer; detecting, by the control circuit, for each of a plurality of frames of the first and second video footages and using a human detection module comprising a neural network model, one or more humans and estimating locations of the one or more humans within at least one of a first region, a second region and a third region of the entrance area and the exit area, wherein the first region corresponds to a region inside of a corresponding doorway of the entrance area and the exit area, wherein the second region corresponds to a region proximate the corresponding doorway, and wherein the third region corresponds to a region outside of the corresponding doorway and further out the corresponding doorway than the second region, and wherein the neural network model is trained using stored footage from one of the first video camera, the second video camera, and a similar video camera having similar resolution and point of view; tracking, by the control circuit over the plurality of frames of the first and second video footages and using a human tracking module according to a set of rules, a location of a detected human, and movement of the detected human relative to the first region, the second region and the third region; determining, by the control circuit, that the detected human has moved from the first region to the second region and to the third region and, in response, incrementing an outbound value; determining, by the control circuit, that the detected human has moved from the third region to the second region and to the first region and, in response, incrementing an inbound value; subtracting, by the control circuit, the outbound value from the inbound value to determine a count of people inside the retail facility; storing, by the control circuit, the count over a period of time to a database coupled to the control circuit; and causing, by the control circuit, an electronic device to display the count.

In some embodiments, the entrance area includes an unguarded entrance. In some embodiments, the method includes storing, by a tracking database coupled to the control circuit, a plurality of identifiers each associated with one of detected human and tracked human on each current frame that is currently being processed by the control circuit for each of a plurality of retail facility. In some embodiments, the method includes determining, by the control circuit, a number of purchase transactions at the retail facility over the period of time. In some embodiments, method includes determining, by the control circuit, a conversion rate at the retail facility based on the number of purchase transactions and the count of people inside the retail facility. In some embodiments, the conversion rate indicates a measurement of a proportion of visitors to the retail facility who make a purchase. In some embodiments, the method includes displaying, by the electronic device, the count over the period of time.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for use in detecting inbound and outbound traffic at a facility, the system comprising:
a video camera configured to capture video footage of an access area to the facility; and
a control circuit coupled to the video camera via a network, the control circuit configured to:
detect, for each of a plurality of frames of the video footage, a human;
estimate a location of the detected human within at least one of a first region, a second region and a third region of the access area, wherein the first region corresponds to a region inside of the access area, wherein the second region corresponds to a region proximate the access area, and wherein the third region corresponds to a region outside of the access area and further out the access area than the second region, wherein the first region, the second region and the third region of the access area are formed from at least two preset horizontal thresholds applied across each of the plurality of frames;
determine whether the detected human is inbound or outbound at the facility based on a relative movement of the detected human within the first region, the second region and the third region; and
transmit data based on the determination.

2. The system of claim 1, wherein the control circuit is configured to detect the human and estimate the location of the human using a human detection module comprising a neural network model.

3. The system of claim 1, wherein the access area comprises an unguarded entrance.

4. The system of claim 1, further comprising a tracking database coupled to the control circuit and configured to store a plurality of identifiers each associated with one of detected human or tracked human on each current frame that is currently being processed by the control circuit for each of a plurality of facilities.

5. The system of claim 1, wherein the access area comprises an entrance area, wherein the data comprises an alert message that indicates that the human has exited the facility through the entrance area, and wherein the alert message further comprises a camera identifier, a store identifier and an image capture of the detected human.

6. The system of claim 5, wherein the control circuit is further configured to:
store the alert message over a period of time;
determine a total count of alert messages over the period of time;
determine whether the total count has reached a threshold value; and
in response to the total count reaching the threshold value, provide a notification message to an electronic device indicating an assignment of an associate at the entrance area.

7. The system of claim 5, wherein the control circuit is further configured to:
store occurrences of the alert message over a period of time;
determine occurrences of shrinkage at the facility over the period of time; and
correlate the occurrences of the alert message with the occurrences of shrinkage over the period of time.

8. The system of claim 5, further comprising an electronic device configured to receive the alert message, wherein the electronic device is worn by an associate at the facility.

9. The system of claim 5, wherein the alert message further comprises a timestamp corresponding to a time the human exited the facility through the entrance area.

10. A method for use in counting humans at an area of a facility over a period of time, the method comprising:
capturing, by a video camera, video footage of an access area of a facility;
detecting, by a control circuit coupled to the video camera, for each of a plurality of frames of the video footage, a human;
estimating, by the control circuit, a location of the detected human within at least one of a first region, a second region and a third region of the access area, wherein the first region corresponds to a region inside of the access area, wherein the second region corresponds to a region proximate the access area, and wherein the third region corresponds to a region outside of the access area and further out the access area than the second region, wherein the first region, the second region and the third region of the access area are formed from at least two preset horizontal thresholds applied across each of the plurality of frames;
determining, by the control circuit, whether the detected human is inbound or outbound at the facility based on a relative movement of the detected human within the first region, the second region, and the third region; and
transmitting, by the control circuit, data based on the determination.

11. The method of claim 10, wherein the access area comprises an unguarded entrance.

12. The method of claim 10, further comprising storing, by a tracking database coupled to the control circuit, a plurality of identifiers each associated with one of detected human or tracked human on each current frame that is currently being processed by the control circuit for each of a plurality of facilities.

13. The method of claim 10, wherein the access area comprises an entrance area, wherein the data comprises an alert message that indicates that the human has exited the facility through the entrance area, and wherein the alert message further comprises a camera identifier, a store identifier and an image capture of the detected human.

14. The method of claim 13, further comprising:
storing, by the control circuit, the alert message over the period of time;
determining, by the control circuit, a total count of alert messages over the period of time;
determining, by the control circuit, whether the total count has reached a threshold value; and
in response to the total count reaching the threshold value, providing, by the control circuit, a notification message to an electronic device indicating an assignment of an associate at the entrance area.

15. The method of claim 13, further comprising:
storing, by the control circuit, occurrences of the alert message over the period of time;
determining, by the control circuit, occurrences of shrinkage at the retail facility over the period of time; and
correlating, by the control circuit, the occurrences of the alert message with the occurrences of shrinkage over the period of time.

16. The method of claim 13, further comprising receiving, by an electronic device, the alert message, wherein the electronic device is worn by an associate at the facility, wherein the alert message further comprises a timestamp corresponding to a time the human exited the facility through the access area.

* * * * *